United States Patent
Shichino

(10) Patent No.: US 10,483,809 B2
(45) Date of Patent: Nov. 19, 2019

(54) POWER TRANSMITTING APPARATUS, METHOD OF CONTROLLING THE SAME, AND POWER TRANSMISSION SYSTEM

(71) Applicant: CANON KABUSHIKI KAISHA, Tokyo (JP)

(72) Inventor: Takahiro Shichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/919,392

(22) Filed: Mar. 13, 2018

(65) Prior Publication Data

US 2018/0205270 A1 Jul. 19, 2018

Related U.S. Application Data

(63) Continuation of application No. 14/769,619, filed as application No. PCT/JP2014/059907 on Mar. 28, 2014, now Pat. No. 9,948,148.

(30) Foreign Application Priority Data

Apr. 19, 2013 (JP) .................................. 2013-088880

(51) Int. Cl.
*H02J 50/60* (2016.01)
*H02J 50/12* (2016.01)
(Continued)

(52) U.S. Cl.
CPC .............. *H02J 50/60* (2016.02); *H02J 5/005* (2013.01); *H02J 7/025* (2013.01); *H02J 17/00* (2013.01);
(Continued)

(58) Field of Classification Search
CPC .. H02J 50/12; H02J 50/80; H02J 5/005; H02J 7/025; H02J 50/10; H02J 50/20; H02J 50/50; H02J 50/60
(Continued)

(56) References Cited

U.S. PATENT DOCUMENTS 5,289,102 A 2/1994 Toya
7,868,762 B2 1/2011 Hartwig et al.
(Continued)

FOREIGN PATENT DOCUMENTS

CN 102136760 A 7/2011
CN 102239619 A 11/2011
(Continued)

OTHER PUBLICATIONS

Korean Office Action dated Nov. 30, 2016, issued in Korean Patent Application No. 10-2015-7032297.
(Continued)

*Primary Examiner* — John W Poos
(74) *Attorney, Agent, or Firm* — Venable LLP

(57) ABSTRACT

Foreign substance detection can be performed with a simple configuration in a power transmission system. A power transmitting apparatus that wirelessly transmits power to a power receiving apparatus, the power transmitting apparatus comprises: determination means for, in a case where an initial impedance value and the detected output impedance value do not match and there is no change in the output impedance value between before and after the transmission of a predetermined detection signal, determining that a foreign substance is present within a predetermined power transmission range, and, in a case where the initial impedance value and the detected output impedance value do not match and there is a change in the output impedance value between before and after the transmission of the predetermined detection signal, determining that a power receiving apparatus is present within the predetermined power transmission range.

16 Claims, 18 Drawing Sheets

(51) Int. Cl.
*H02J 50/40* (2016.01)
*H02J 50/80* (2016.01)
*H02J 5/00* (2016.01)
*H02J 7/02* (2016.01)
*H02J 17/00* (2006.01)

(52) U.S. Cl.
CPC .............. *H02J 50/12* (2016.02); *H02J 50/40* (2016.02); *H02J 50/80* (2016.02)

(58) Field of Classification Search
USPC ........................................................ 307/104
See application file for complete search history.

(56) References Cited

U.S. PATENT DOCUMENTS

| | | | |
|---|---|---|---|
| 7,948,209 | B2 | 5/2011 | Jung |
| 8,004,118 | B2 | 8/2011 | Kamijo et al. |
| 8,391,258 | B2 | 3/2013 | Shichino |
| 8,723,642 | B2 | 5/2014 | Park et al. |
| 8,829,728 | B2 | 9/2014 | Yamamoto et al. |
| 8,994,326 | B2 | 3/2015 | Takada et al. |
| 9,001,881 | B2 | 4/2015 | Okamura et al. |
| 9,136,914 | B2 | 9/2015 | Von Norvak et al. |
| 9,219,379 | B2 | 12/2015 | Uramoto et al. |
| 9,246,350 | B2 | 1/2016 | Jung et al. |
| 9,287,719 | B2 | 3/2016 | Katsunaga et al. |
| 9,379,570 | B2 | 6/2016 | Tanabe |
| 9,577,437 | B2 | 2/2017 | Fells et al. |
| 9,735,623 | B2 | 8/2017 | Byun et al. |
| 2009/0001932 | A1 | 1/2009 | Kamijo et al. |
| 2010/0026236 | A1 | 2/2010 | Kamiyama et al. |
| 2010/0295378 | A1 | 11/2010 | Suzuki et al. |
| 2011/0184584 | A1 | 7/2011 | Ukita et al. |
| 2012/0056485 | A1 | 3/2012 | Haruyama |
| 2012/0098348 | A1 | 4/2012 | Inoue et al. |
| 2012/0163619 | A1 | 6/2012 | Kinoshita et al. |
| 2012/0193007 | A1 | 8/2012 | Mori |
| 2012/0212070 | A1* | 8/2012 | Tanabe .................... H02J 5/005 307/104 |
| 2012/0261998 | A1 | 10/2012 | Sato |
| 2012/0307873 | A1 | 12/2012 | Kim et al. |
| 2013/0170483 | A1 | 7/2013 | Shichino |
| 2013/0293028 | A1 | 11/2013 | Byun et al. |
| 2014/0125287 | A1 | 5/2014 | Nakano et al. |
| 2014/0225452 | A1 | 8/2014 | Kozaki et al. |
| 2015/0097433 | A1 | 4/2015 | Shichino |
| 2016/0072339 | A1 | 3/2016 | Shichino |
| 2016/0094050 | A1 | 3/2016 | Shichino et al. |
| 2016/0119884 | A1 | 4/2016 | Shichino |
| 2016/0126749 | A1 | 5/2016 | Shichino |

FOREIGN PATENT DOCUMENTS

| | | |
|---|---|---|
| CN | 102292921 A | 12/2011 |
| CN | 102439820 A | 5/2012 |
| CN | 102457107 A | 5/2012 |
| EP | 2442431 A1 | 4/2012 |
| JP | H05-38069 A | 2/1993 |
| JP | 2001-069388 A | 3/2001 |
| JP | 2001-218391 A | 8/2001 |
| JP | 2009-011129 A | 1/2009 |
| JP | 2009-118587 A | 5/2009 |
| JP | 2009-124889 A | 6/2009 |
| JP | 2010-45960 A | 2/2010 |
| JP | 2010-104103 A | 5/2010 |
| JP | 2010-273453 A | 12/2010 |
| JP | 2010-288430 A | 12/2010 |
| JP | 2011-45190 A | 3/2011 |
| JP | 2011-177015 A | 9/2011 |
| JP | 2011-244531 A | 12/2011 |
| JP | 2012-19876 A | 2/2012 |
| JP | 2012-2060721 A | 3/2012 |
| JP | 2012-105458 A | 5/2012 |
| JP | 2012-130173 A | 7/2012 |
| JP | 2012-147417 A | 8/2012 |
| JP | 2012-170194 A | 9/2012 |
| JP | 2012-200056 A1 | 10/2012 |
| JP | 2012-223070 A1 | 11/2012 |
| JP | 2012-254003 A | 12/2012 |
| JP | 2013-005687 A | 1/2013 |
| JP | 2013-17379 A | 1/2013 |
| JP | 2013-27129 A | 2/2013 |
| JP | 2013-62895 A | 4/2013 |
| JP | 2013-523072 A | 6/2013 |
| JP | 2013-543718 A | 12/2013 |
| JP | 2014-515254 A | 6/2014 |
| KR | 10-2012-0120692 A | 11/2012 |
| KR | 10-2012-0128554 A | 11/2012 |
| WO | 2009/063975 A1 | 5/2009 |
| WO | 2010/040015 A2 | 4/2010 |
| WO | 2010/119577 A1 | 10/2010 |
| WO | 2011112064 A2 | 9/2011 |
| WO | 2011128969 A1 | 10/2011 |
| WO | 2012037279 A1 | 3/2012 |
| WO | 2012157969 A1 | 11/2012 |
| WO | 2013/038808 A1 | 3/2013 |

OTHER PUBLICATIONS

Office Action dated Mar. 30, 2017, in Chinese Patent Application No. 201480022286.1.
Office Action dated Sep. 1, 2017, in Japanese Patent Application No. 2013-088880.
Office Action in Japanese Patent Application No. 2017-230717, dated Mar. 1, 2019.
Office Action in Indian Patent Application No. 7012/CHENP/2015, dated Dec. 18, 2018.
Office Action in Japanese Patent Application No. 2017-230717, dated Sep. 30, 2019.

* cited by examiner

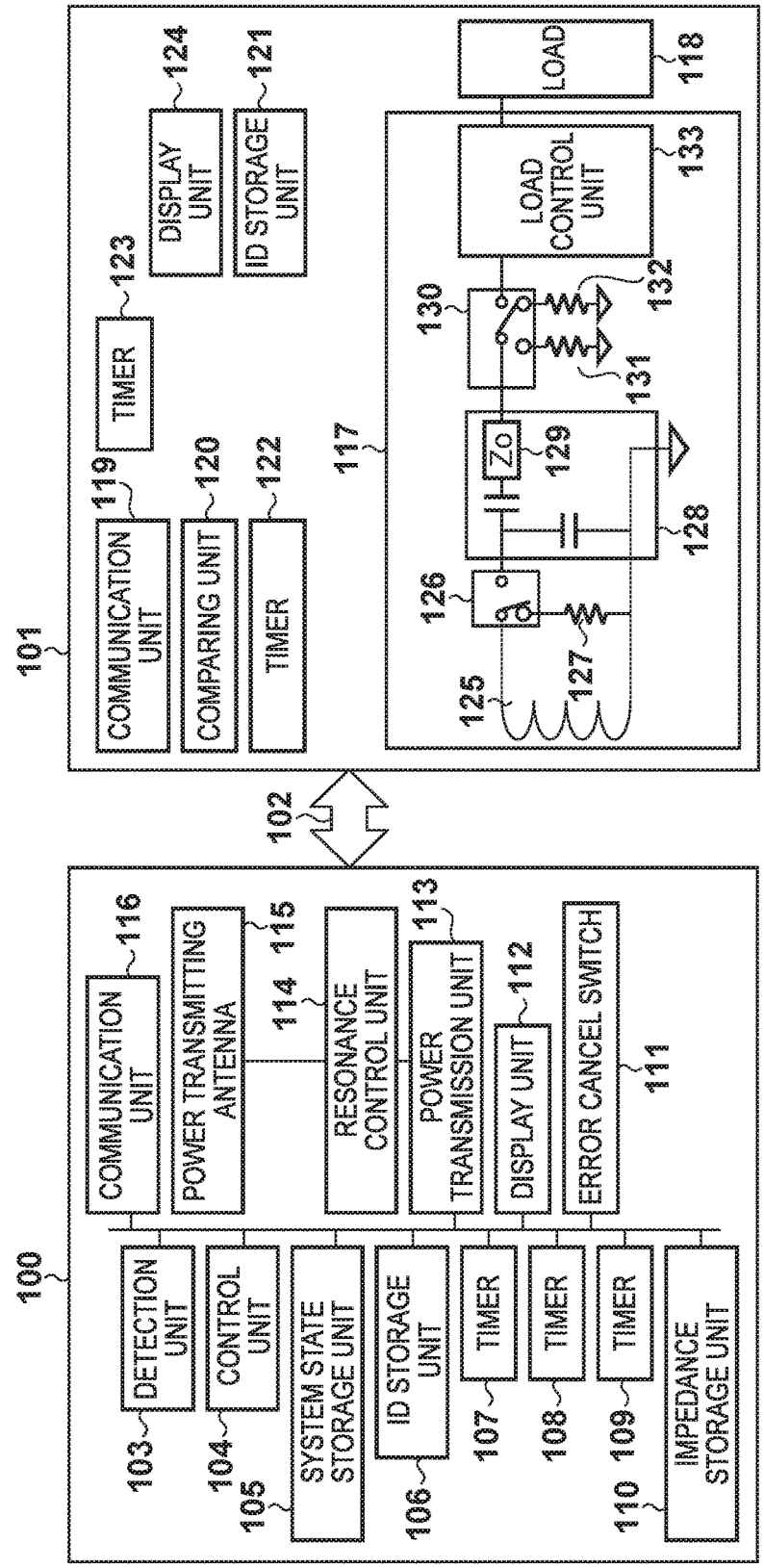

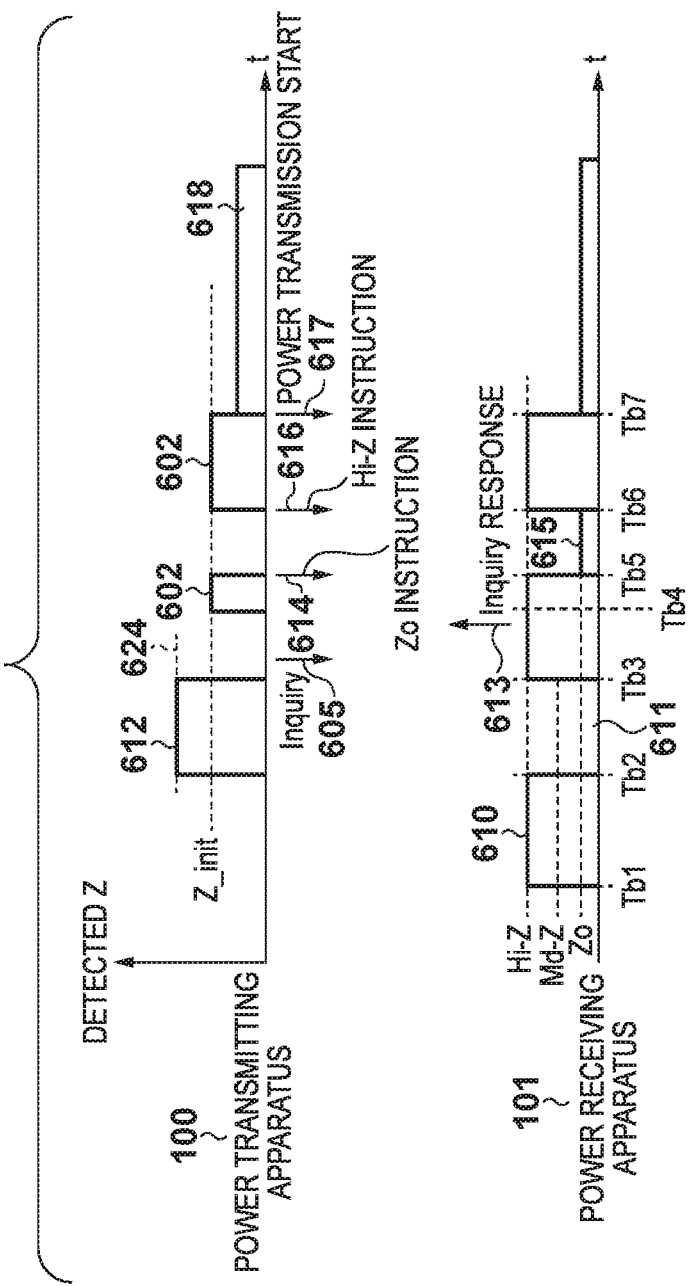

FIG. 7

|     | POWER TRANSMISSION FLAG 700 | SUSPEND FLAG 701 | PROHIBIT FLAG 703 | APPARATUS FLAG 704 |
|-----|---|---|---|---|
| 705 | 0 | 0 | 0 | 0 |
| 706 | 0 | 1 | 0 | 0 |
| 707 | 0 | 0 | 1 | 0 |
| 708 | 1 | 0 | 0 | 1 |
| 709 | 0 | 1 | 0 | 1 |
| 710 | 0 | 0 | 1 | 1 |

FIG. 8

| BT ADDRESS 800 |
|---|
| bb bb bb bb bb bb |

FIG. 9

| BT ADDRESS 900 | BT ADDRESS 901 |
|---|---|
| aa aa aa aa aa aa | aa aa aa aa aa aa |

FIG. 15

|  | 1500 | 1501 |
|---|---|---|
|  | Z_before | Z_now |
| 1502 | Z_init | Z_init |
| 1503 | Z_init | Z1 |

POWER TRANSMITTING APPARATUS, METHOD OF CONTROLLING THE SAME, AND POWER TRANSMISSION SYSTEM

TECHNICAL FIELD

The present invention relates to a wireless power transmission technique.

BACKGROUND ART

In recent years, wireless power transmission systems have undergone broad technical development. Incidentally, if a foreign substance such as a piece of metal is present in the range in which a power transmitting apparatus can transmit power, an eddy current will flow in the foreign substance and unintended heating will occur. For this reason, in a wireless power transmission system, it is necessary to perform appropriate power transmission to a power receiving apparatus while giving consideration to the influence on foreign substances. For example, Japanese Patent Laid-Open No. 2013-17379 (Patent Literature 1) proposes a technique of providing a power receiving apparatus with a circuit for measuring the Q-value of the power receiving antenna and performing foreign substance detection using the Q-value measurement result.

However, in the technique disclosed in Patent Document 1 above, there is a problem in that the circuit for measuring the Q-value of the power receiving antenna needs to be newly provided and the cost will increase.

SUMMARY OF INVENTION

According to an aspect of the present invention, a power transmitting apparatus that wirelessly transmits power to a power receiving apparatus, the power transmitting apparatus comprises: power transmission means for performing wireless power transmission to a power receiving apparatus arranged within a predetermined power transmission range; storage means for storing an initial impedance value that is an output impedance value of the power transmission means in a state where no object is present within the predetermined power transmission range; detection means for detecting the output impedance of the power transmission means when a predetermined detection signal has been transmitted by the power transmission means; and determination means for, in a case where the initial impedance value and the output impedance value detected by the detection means do not match and there is no change in the output impedance value between before and after the transmission of the predetermined detection signal, determining that a foreign substance is present within the predetermined power transmission range, and, in a case where the initial impedance value and the output impedance value detected by the detection means do not match and there is a change in the output impedance value between before and after the transmission of the predetermined detection signal, determining that a power receiving apparatus is present within the predetermined power transmission range.

According to an aspect of the present invention, it is possible to provide a technique that enables foreign substance detection using a simple configuration and enables appropriate power transmission control in a power transmission system.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 1 is a diagram of an overall configuration of a power transmission system according to a first embodiment.

FIGS. 6A and 6B are timing diagrams for describing operations of a power transmitting apparatus.

FIG. 7 is a diagram showing an example of flags stored in a system state storage unit 105.

FIG. 8 is a diagram showing an example of information stored in an ID storage unit 106 in the power transmitting apparatus.

FIG. 9 is a diagram showing an example of information stored in an ID storage unit 121 in a power receiving apparatus.

FIG. 15 is a diagram showing an example of information stored by an impedance storage unit 110.

DESCRIPTION OF EMBODIMENTS

Figure 2A:
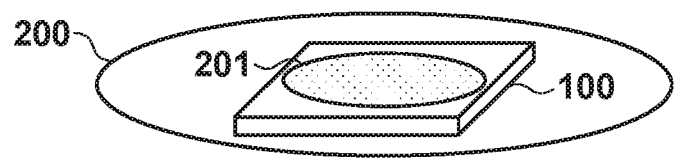
FIGS. 2A to 2D are diagrams showing examples of states in the periphery of a power transmission range in the power transmission system.

Preferred embodiments of the present invention will be described in detail below with reference to the drawings. Note that the embodiments below are merely examples and are not intended to limit the scope of the present invention.

First Embodiment

A first embodiment of a power transmission system according to the present invention will be described below using, as an example, a wireless power transmission system including a power transmitting apparatus 100 that performs wireless power transmission and a power receiving apparatus 101.

Configuration of Apparatuses

FIG. 1 is a diagram of the overall configuration of the power transmission system according to the first embodiment. The power transmitting apparatus 100 and the power receiving apparatus 101 perform power transmission via a medium 102. Note that the power transmitting apparatus and the power receiving apparatus exchange control information that is to be used for wireless power transmission control via communication units included in both apparatuses, and this will be described in detail later. For this reason, control for establishing and disconnecting a communication channel between the power transmitting apparatus and the power receiving apparatus will also be described.

The configuration of the power transmitting apparatus 100 will be described first. A detection unit 103 is a functional unit that performs detection of an output impedance value (referred to as "Z-detection" below) of a DC voltage source 401 in a class-E amplifier that constitutes a power transmission unit 113, and will be described in detail later. A control unit 104 is a functional unit that controls the power transmitting apparatus 100 according to the detection result of the detection unit 103. A system state storage unit 105 is a functional unit that stores states of the power transmission system and will be described in detail later with reference to FIG. 7. An ID storage unit 106 is a functional unit that stores identification information of the power receiving apparatus 101 and will be described in detail later with reference to FIG. 8.

A first timer 107, a second timer 108, and a third timer 109 are timers that are used as appropriate according to the system operation state and will be described in detail later. An impedance storage unit 110 is a functional unit that stores results of impedance value detection performed by the detection unit 103 and will be described in detail later with reference to FIG. 15. An error cancel switch 111 is a functional unit that receives a user operation, for example, in order to cancel a system error state. A display unit 112 is a functional unit that displays information regarding the wireless power transmission system, and displays error information for example.

The power transmission unit 113 supplies power to be transmitted via the medium 102 to a power transmitting antenna 115. Here, the power transmission unit 113 is described as being constituted by a class-E amplifier. A resonance control unit 114 is a functional unit that controls the resonance frequency and characteristic impedance of the transmission channel that is constituted by a power transmitting antenna 115, the power receiving antenna 125, and the medium 102.

A communication unit 116 (power transmitting apparatus communication means) is a functional unit that exchanges control signals regarding power that is to be transmitted between the power transmitting antenna 115 and the power receiving antenna 125. Note that the control signals are exchanged via antennas for communication (not shown). In the first embodiment, the communication unit 116 is compatible with a Bluetooth (registered trademark) standard (referred to as "BT" below), but it may be compatible with another communication standard. Also, here, the communication unit 116 functions as a BT-standard master device. In addition, the power transmitting apparatus 100 is configured to use SDP (Service Delivery Protocol) to announce services that it provides to peripheral devices, and this will be described in detail later. Here, the power transmitting apparatus 100 announces that it provides a service called "Wireless Charger".

The configuration of the power receiving apparatus 101 will be described next. A power reception unit 117 is a functional unit that receives power transmitted from an external apparatus (here, the power transmitting apparatus 100). A load 118 consumes power received by the power reception unit 117, and it is constituted by a charge circuit and a battery here. A communication unit 119 (power receiving apparatus communication means) is a functional unit that exchanges control signals regarding power that is to be transmitted between the power transmitting antenna 115 and the power receiving antenna 125. It is compatible with the BT standard, similarly to the communication unit 116. Here, the communication unit 119 is described as functioning as a BT-standard slave device.

A comparing unit 120 is a functional unit that compares information received by the power receiving antenna 125 and information received by the communication unit 119. An ID storage unit 121 stores information received by the power receiving antenna 125 and identification information for the power transmitting apparatus 100 that is received using the communication unit 119. A fourth timer 122 and a fifth timer 123 are timers that are used as appropriate according to the system operation state, and will be described in detail later.

A display unit 124 is a functional unit that displays information regarding the wireless power transmission system, and displays error information for example. The power receiving antenna 125 is a functional unit that electromagnetically couples with the power transmitting antenna 115 and receives power. A switching unit 126 is a functional unit that connects the power receiving antenna 125 to a resonance unit 128 or a high resistance 127.

The high resistance 127 is a constant resistance of around several megaohms, for example. It has a configuration in which the impedance of the power receiving antenna 125 seen by the power transmitting antenna 115 becomes a high impedance (referred to as "Hi-Z" below) when the power receiving antenna 125 and the high resistance 127 are connected. Note that approximately no current flows in the power receiving antenna 125 when the impedance is set to Hi-Z.

The resonance unit 128 is a functional unit for causing the power transmission channel to resonate at a specific impedance. Here, the power transmission channel is constituted by the resonance control unit 114, the power transmitting antenna 115, the medium 102 that is to be the transmission channel, and the power receiving antenna 125. Note that a characteristic impedance 129 is a characteristic impedance in the case where the resonance circuit is seen by a load switching unit 130, and here, the value is Zo.

The load switching unit 130 is a functional unit that performs switching between a matching resistance 132 whose resistance value is approximately equal to Zo, a load control unit 133, and an intermediate resistance 131. The intermediate resistance 131 has a resistance value that is lower than the high resistance 127 and higher than the matching resistance 132. The intermediate resistance 131 is for setting the impedance of the power receiving antenna 125 seen by the power transmitting antenna 115 to an intermediate impedance (referred to as "Md-Z" below) by connecting to the load switching unit 130. When the impedance of the power receiving antenna 125 seen by the power transmitting antenna 115 is set to Md-Z, a microcurrent flows in the power receiving antenna 125 and the intermediate resistance 131.

The load control unit 133 is an impedance conversion circuit that performs an operation of matching the load impedance that changes according to the power consumption of the load 118 with the characteristic impedance 119 (Zo), and it is constituted by a DC-DC converter or the like. Note that the load impedance means the impedance when the load 118 is seen by the load control unit 133.

Note that the impedance conversion operation is expressed as "load impedance control" in the description below. The load control unit 133 and the matching resistance 132 have the same function in that they both are both used to perform impedance matching with the resonance unit 128. However, after detecting a change in the impedance of the load 118, the load control unit 133 performs impedance conversion, and therefore a certain amount of time is required for the operation to stabilize. On the other hand, since the matching resistance 132 is a constant resistance, no time is required for the operation to stabilize.

Impedance in States of Periphery of Power Transmitting Range

FIGS. 2A to 2D are diagrams showing examples of states in the periphery of the power transmission range in the power transmission system. Note that a communication range 200 indicates a range in which communication by means of the communication unit 116 in the power transmitting apparatus 100 is possible. A power transmission range 201 indicates a range in which power transmission by means of the power transmitting antenna 115 is possible. As shown in FIG. 2A, the communication range 200 is configured to be larger than the power transmission range 201, and the communication range 200 is configured to contain the entirety of the power transmission range 201.

Figure 2B:
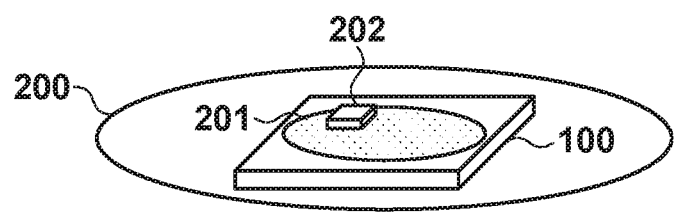
Figure 2C:
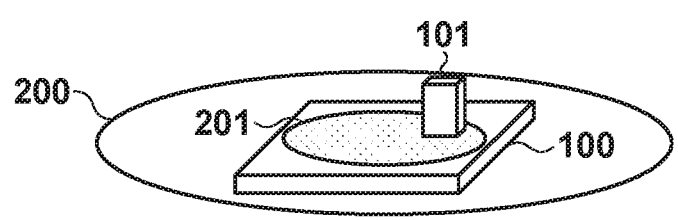
Figure 2D:
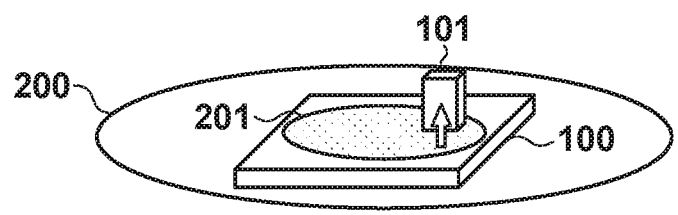

FIG. 2A shows a state where nothing is arranged in the power transmission range 201. That is to say, the power receiving apparatus 101 and a foreign substance 202 are not present in the power transmission range 201. FIG. 2B shows a state where only the foreign substance 202 is present in the power transmission range 201. FIG. 2C shows a state where only the power receiving apparatus 101 is present in the power transmission range 201. Note that in FIG. 2C, the power transmitting apparatus 100 is not transmitting power to the power receiving apparatus 101. FIG. 2D is the same as FIG. 2C in that the power receiving apparatus 101 is present in the power transmission range 201, but the power transmitting apparatus 100 is transmitting power to the power receiving apparatus 101. Note that the arrow 202 conceptually illustrates that power is being transmitted.

If the object that is present in the power transmission range 201 is the foreign substance 202 (FIG. 2B), the power transmitting apparatus 100 needs to perform control so as to not perform power transmission. On the other hand, if the object that is present in the power transmission range 201 is the power receiving apparatus 101 (FIG. 2C), the power transmitting apparatus 100 needs to perform control so as to perform power transmission.

Figure 3:
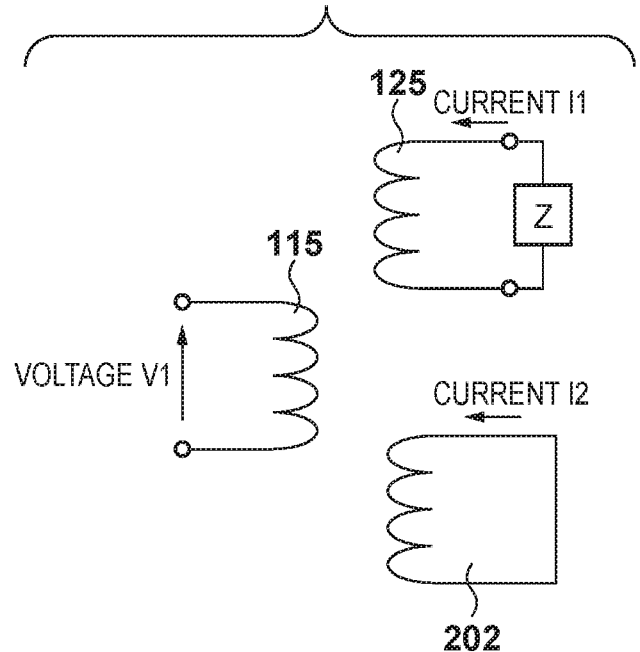
FIG. 3 is a diagram for describing an operation of a detection unit 103.

FIG. 3 is a diagram for describing an operation of the detection unit 103. FIG. 3 includes the power transmitting antenna 115, the power receiving antenna 125, and the foreign substance 202. A voltage V1 indicates a voltage at both terminals of the power transmitting antenna 115. A current I1 indicates a current flowing in the power receiving antenna 125, and a current I2 indicates a current flowing in the foreign substance 202. Z is the impedance value of the power receiving antenna 125.

The value of the voltage V1 changes according to the current I1 and the current I2. Accordingly, the voltage V1 in the state where the foreign substance 202 and the power receiving apparatus 101 are not present in the power transmission range 201 as shown in FIG. 2A (referred to here as "V_init") indicates a value that is different from the voltage V1 in the state where the foreign substance 202 is present in the power transmission range 201 as shown in FIG. 2B. In other words, if the voltage V_init in the state where the foreign substance 202 and the power receiving apparatus 101 are not present in the power transmission range 201 is stored in advance, the power transmitting apparatus 100 can detect the foreign substance 202 by detecting the voltage V1 in the state in FIG. 2B and comparing it with V_init. Also, if the power receiving apparatus 101 is present in the power transmission range 201 as shown in FIG. 2C, the voltage V1 similarly indicates a value that is different from V_init. In other words, the power transmitting apparatus 100 can detect that the foreign substance 202 or the power receiving apparatus 101 is present in the power transmission range 201 by comparing the voltage V1 with V_init.

Incidentally, the magnitude of the current I1 that flows in the power receiving antenna 125 can be controlled by changing the impedance Z. If the impedance Z is set to Hi-Z (e.g., infinity), the current I1 will be zero. If the power receiving apparatus 101 is present in the power transmission range 201 as shown in FIG. 2C, the voltage V1 indicates a value that is different from V_init, as described above. If the power receiving apparatus 101 performs control such that the impedance Z is set to Hi-Z, or in other words, such that the current I1 is set to zero in this state, the voltage V1 will be equal to V_init.

In the state shown in FIG. 2C, the power transmitting apparatus 100 can detect that the foreign substance 202 or the power receiving apparatus 101 is present in the power transmission range 201 based on the change in the voltage V1. However, the power transmitting apparatus 100 cannot determine whether the cause of the change is the foreign substance 202 or the power receiving apparatus 101.

Incidentally, if the power receiving apparatus 101 controls the impedance Z such that it is Hi-Z in the state shown in FIG. 2C, the current I1 will be zero, and the voltage V1 will be V_init. In other words, the power transmitting apparatus 100 can determine that the power receiving apparatus 101 is present in the power transmission range 201. On the other hand, if the power receiving apparatus 101 controls the impedance Z such that it is Hi-Z and the voltage V1 is not equal to V_init, the power transmitting apparatus 100 can detect that the foreign substance 202 is present in the power transmission range 201.

Also, if the power receiving apparatus 101 controls the impedance Z such that it is Md-Z in the state shown in FIG. 2C, a microcurrent will flow in the power receiving antenna 125 and the impedance Z. For this reason, the power receiving apparatus 101 can detect the power transmitting apparatus 100 by detecting the microcurrent. Note that the change in the voltage V1 can also be expressed as a change in the input impedance of the power transmitting antenna 115 that is obtained by dividing the voltage V1 by the current flowing in the power transmitting antenna 115.

Figure 4:
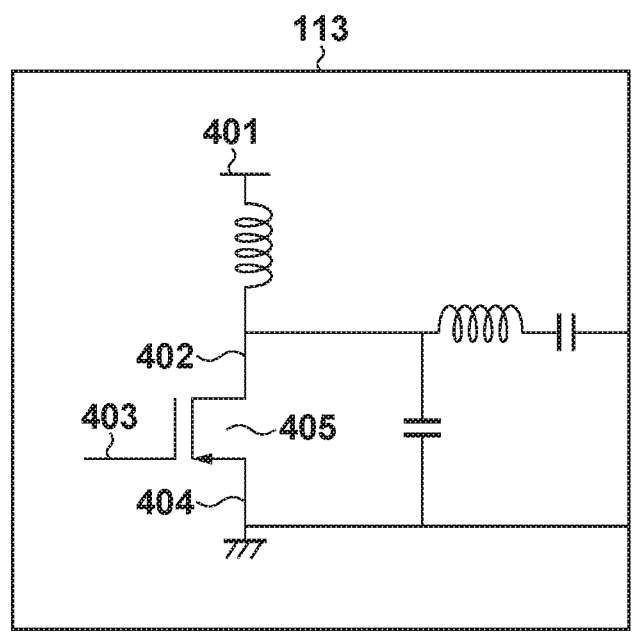
FIG. 4 is a diagram showing an exemplary configuration of a class-E amplifier.

FIG. 4 is a diagram showing an example of the configuration of the class-E amplifier that constitutes the power transmission unit 113. The class-E amplifier is constituted by an N-channel MOSFET 405, two inductors, and two capacitors. Reference numeral 403 indicates a gate terminal, reference numeral 402 indicates a drain terminal, and reference numeral 404 indicates a source terminal. Reference numeral 401 indicates a DC voltage source that is input to the N-channel MOSFET 405. The power transmission unit 113 is connected to the power transmitting antenna 115 via the resonance control unit 114. For this reason, the input impedance of the power transmitting antenna 115 is expressed as a change in the output impedance of the class-E amplifier. Also, a change in the output impedance of the class-E amplifier is expressed as a change in the output impedance of the DC voltage source 401.

In other words, if the output impedance value of the DC voltage source in the state shown in FIG. 2A is stored in advance, the power transmitting apparatus 100 can detect the foreign substance 202 or the power receiving apparatus 101. The output impedance value of the DC voltage source in the state shown in FIG. 2A (initial impedance value) will be expressed as "Z_init" below.

Three impedance values (Hi-Z, Md-Z, and Zo) that are set as the impedance of the power receiving apparatus 101 will be described next.

Hi-Z is an impedance value that is used for apparatus protection and apparatus detection. When a large current unexpectedly flows in the power reception unit 117 including the power receiving antenna 125, there is a risk that the circuit will be damaged and it is very dangerous in terms of circuit protection. In view of this, the current I1 that flows in the power reception unit 117 can be set to zero in principle by setting the impedance of the power receiving apparatus 101 to Hi-Z, and the risk can be reduced. Accordingly, the power receiving apparatus 101 is set to Hi-Z as often as possible in the interest of circuit protection. Also, although the power transmitting apparatus 100 can detect that at least one of the foreign substance 202 and the power receiving apparatus 101 is present in the power transmission range 201 by detecting the change in the voltage V1 as described above, the power transmitting apparatus 100 cannot identify which one it is. At this time, if the impedance of the power receiving apparatus 101 is set to Hi-Z, the power transmitting apparatus 100 can perform this identification.

Md-Z is the impedance value that is used for apparatus detection. As described above, the power receiving apparatus 101 can detect the power transmitting apparatus 100 by setting the impedance to Md-Z. Also, since the voltage V1 of the power transmitting antenna 115 changes due to the microcurrent that flows in the power receiving antenna 125, the power transmitting apparatus 100 can detect the power receiving apparatus 101 as well if the impedance of the power receiving apparatus 101 is set to Md-Z.

Zo is the impedance value that is used when the transmission efficiency is to be calculated. If the output impedance of the power transmitting antenna (output impedance Z in FIG. 3) and the impedance of the load have not been matched, the transmission efficiency between the power transmitting antenna 115 and the power receiving antenna 125 will decrease due to reflection. For this reason, it is better not to perform power transmission in the case where, before starting power transmission to the power receiving apparatus 101, the power transmitting apparatus 100 calculates the transmission efficiency between the power transmitting and receiving antennas and the efficiency is excessively low. In the case of using Hi-Z or Md-Z when calculating the transmission efficiency, the transmission efficiency between the power transmission and reception antennas cannot be calculated accurately since impedance matching between the power receiving antenna and the load cannot be achieved and there is a lot of reflection. Accordingly, when the transmission efficiency is to be calculated, the impedance of the power receiving apparatus 101 is set to Zo such that matching can be achieved with the output impedance Zo of the power receiving antenna. Needless to say, in order to improve the transmission efficiency, the impedance of the power receiving apparatus 101 is set to Zo also when power is to be received from the power transmitting apparatus 100.

Operation of Detection Unit of Power Transmitting Apparatus

Figure 5:
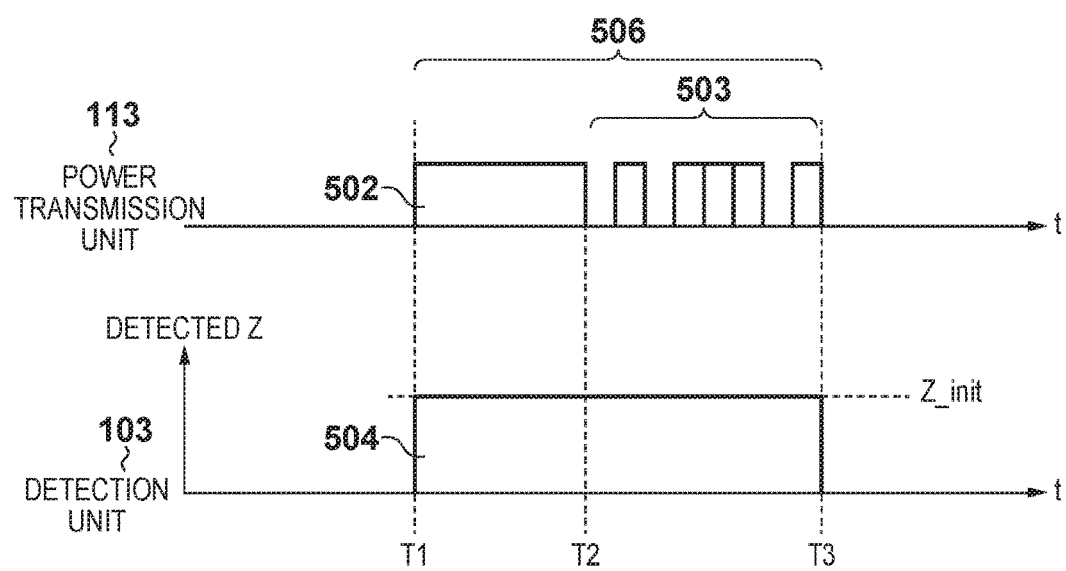
FIG. 5 is a timing diagram for describing operations of a power transmission unit 113 and the detection unit 103.

FIG. 5 is a timing diagram for describing operations of the power transmission unit 113 and the detection unit 103. The horizontal axis indicates time. From time T1 to time T2, a detection signal 502 for the detection unit 103 to perform Z-detection is transmitted by the power transmission unit 113 via the power transmitting antenna 115. Also, from time T2 to time T3, a BT address that is an address uniquely assigned to the communication unit 116 is transmitted using a BT address signal 503 via the power transmitting antenna 115.

The detection unit 103 detects the impedance of the DC voltage source 401 from time T1 to time T3. Square 504 indicates that the detection unit 103 is performing Z-detection. Also, the height of square 504 conceptually illustrates the magnitude of the impedance detected during Z-detection. For example, in the case of FIG. 2A, the height of square 504 corresponds to Z_init. Reference numeral 506, which includes the detection signal 502 and the BT address signal 503, is referred to as a "pulse" in the description below.

Information Stored in Various Storage Units

FIG. 7 is a diagram showing an example of flags stored in the system state storage unit 105.

A power transmission flag 700 is a flag that is set to "1" when the power transmitting apparatus 100 starts power transmission and is set to "0" when power transmission is stopped. A suspend flag 701 is a flag that is set to "1" when power transmission is stopped while the control unit 104 is performing the identification and is set to "0" at other times. A prohibit flag 703 is a flag that is set to "1" when power transmission is prohibited, and is set to "0" at other times. An apparatus flag 704 is a flag that is set to "1" if a BT connection has been achieved between the communication unit 116 of the power transmitting apparatus 100 and the communication unit 119 of the power receiving apparatus 101, and is set to "0" if not.

FIG. 8 is a diagram showing an example of information stored in the ID storage unit 106 in the power transmitting apparatus. After the control unit 104 has determined that the power receiving apparatus 101 is the cause of the impedance change, the BT address of the power receiving apparatus 101 is stored in a storage region 800. Also, if the control unit 104 disconnects the BT connection with the power receiving apparatus 101, the BT address of the corresponding power receiving apparatus 101 is cleared from the storage region 800.

FIG. 9 is a diagram showing an example of information stored in the ID storage unit 121 in the power receiving apparatus. When the pulse 506 that is transmitted by the power transmission unit 113 via the power transmitting antenna 115 is received by the power receiving antenna 125 and the BT address included in the pulse 506 is detected, the detected BT address is stored in the storage region 900. Also, when the power transmitting apparatus 100 has stopped power transmission, or in other words, in the case where the suspend flag or the prohibit flag is "1", the power receiving apparatus 101 deletes the BT address stored in the storage region 900.

On the other hand, the BT address stored in the storage region 901 is a BT address for the power transmitting apparatus 100 that is received by the communication unit 119 of the power receiving apparatus 101 via the communication unit 116 of the power transmitting apparatus 100. The power transmitting apparatus 100 transmits a later-described Inquiry message, and when the power receiving apparatus 101 receives the Inquiry message, the power receiving apparatus 101 detects the BT address of the power transmitting apparatus that is the transmission source based on the header information of the Inquiry message. Then, the detected BT address is stored in the storage region 901. Also, if the BT connection between the power transmitting apparatus 100 and the power receiving apparatus 101 is disconnected, the power receiving apparatus 101 deletes the BT address stored in the storage region 901.

FIG. 15 is a diagram showing an example of information stored in the impedance storage unit 110. The impedance value obtained as a result of the Z-detection performed by the detection unit 103 is stored (overwritten) in Z_now in column 1501. Note that the detection unit 103 copies the content of Z_now to Z_before in column 1500 before the content is overwritten. By doing so, the impedance value in the previous Z-detection is stored in Z_before, and it is possible to compare Z_before with Z_now, which is the result of the most recent Z-detection.

Power Transmission System Operation Example 1 (Operation when Foreign Substance is Present)

Figure 6A:
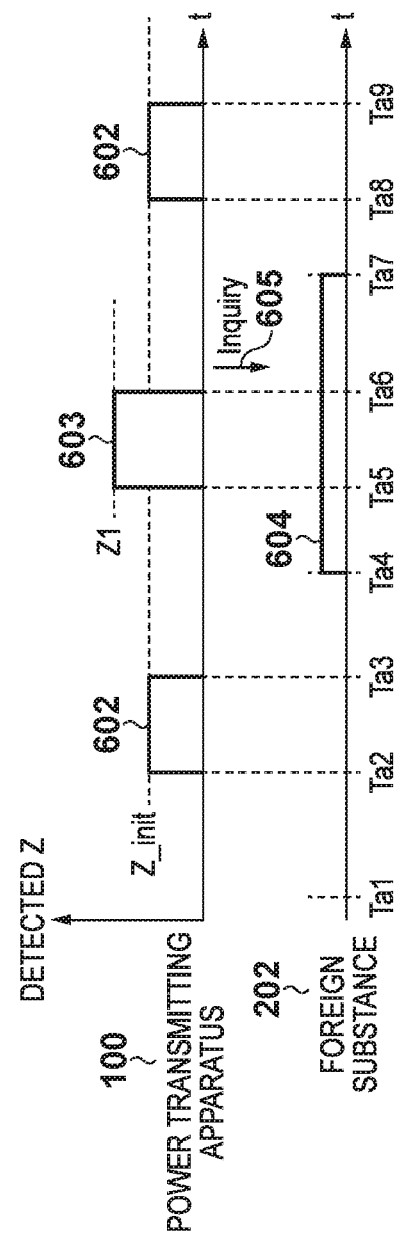
Figure 10A:
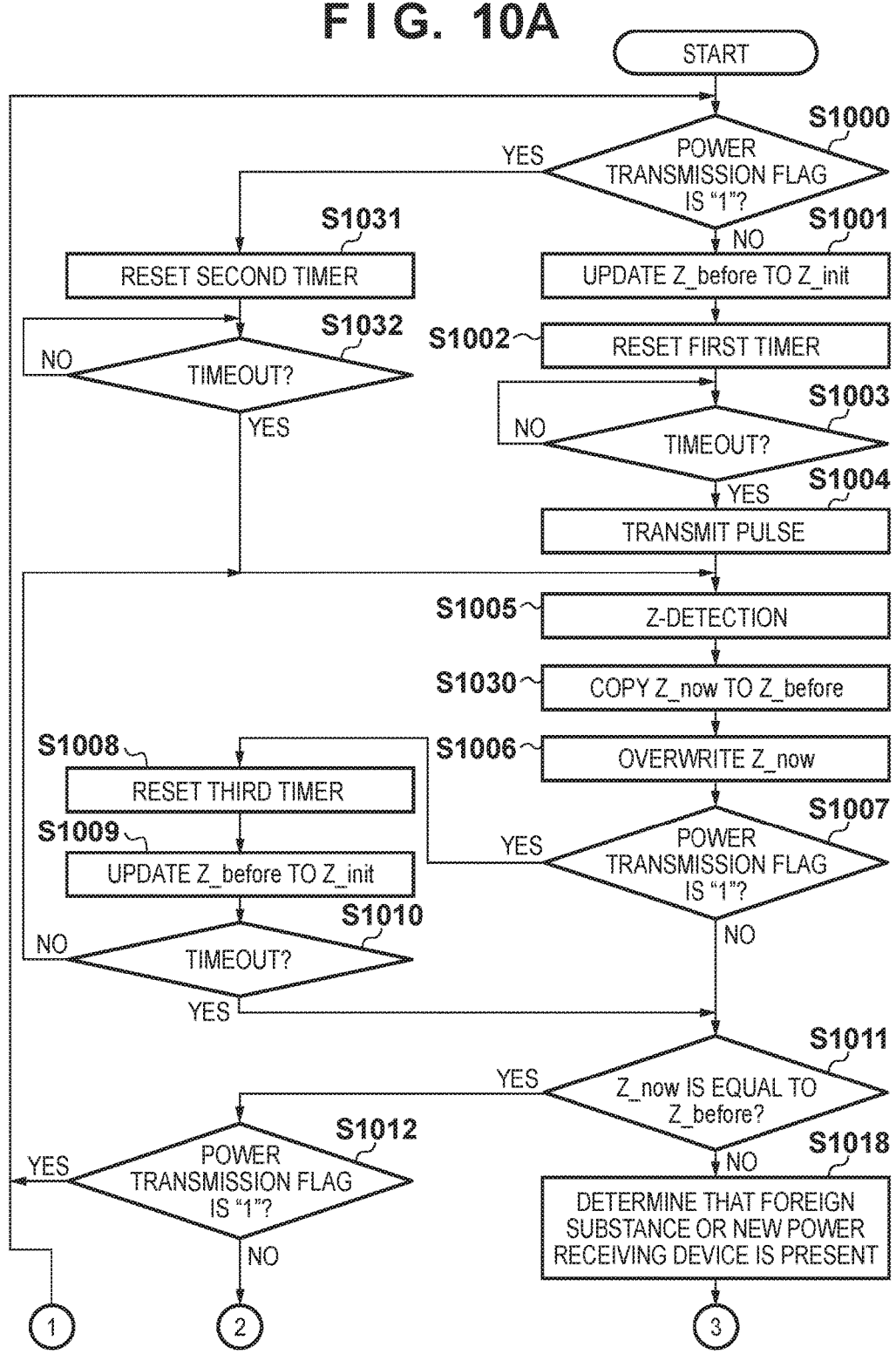
FIGS. 10A and 10B are flowcharts of operations of the detection unit 103.
Figure 10B:
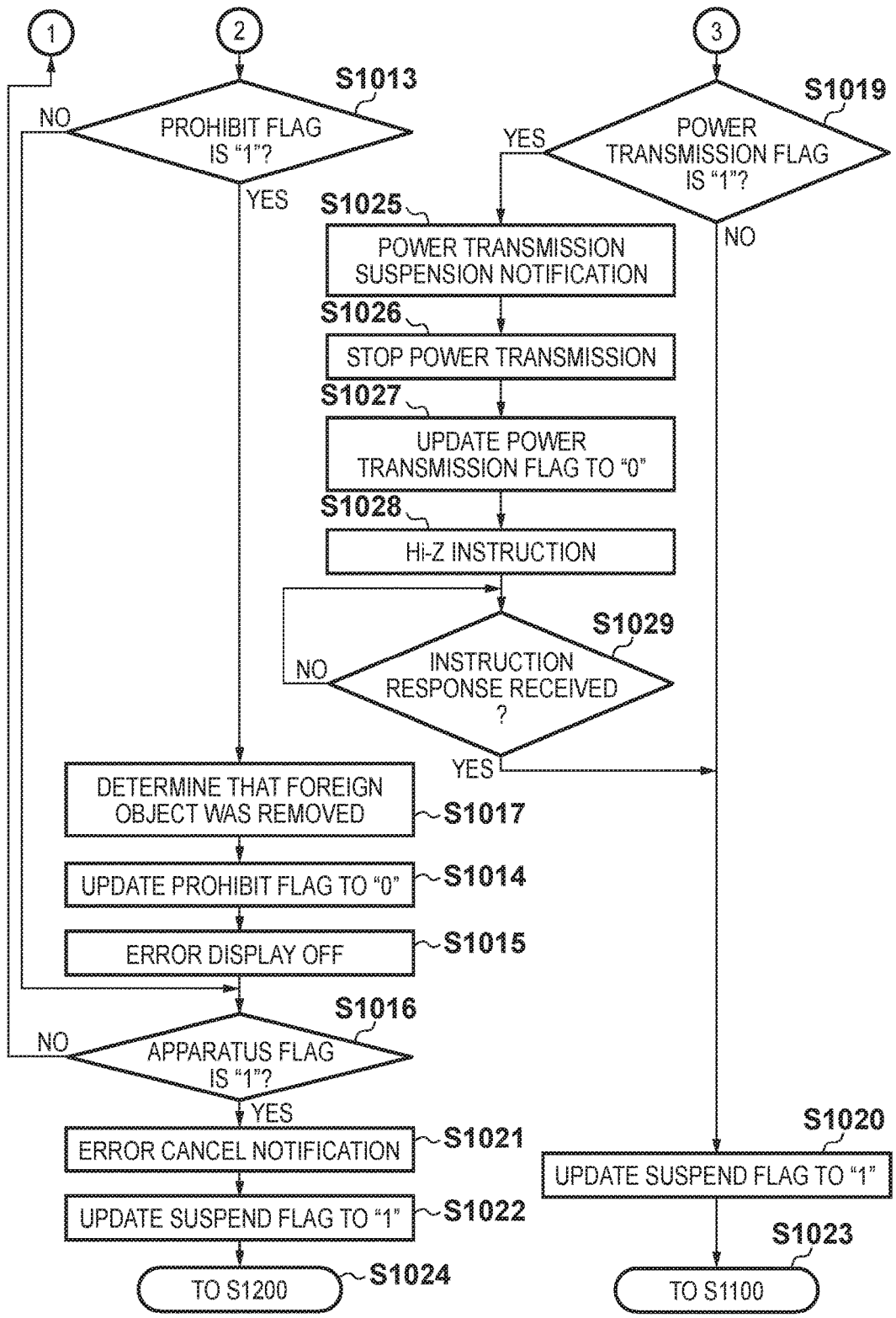

FIGS. 6A and 6B are timing diagrams for describing operations of the power transmitting apparatus. In particular, FIG. 6A is a timing diagram for the power transmitting apparatus 100 in the case where the foreign substance 202 enters the power transmission range 201 at time Ta4, and the horizontal axis indicates time. Also, FIGS. 10A and 10B are a flowchart of operations for the detection unit 103.

Operations of the power transmitting apparatus 100 in the state shown in FIG. 2A, or in other words, in the initial state where nothing is arranged will be described first. In the state shown in FIG. 2A, the system state storage unit 105 is in a state where the flags shown in row 705 have been stored. According to row 705, the power transmitting apparatus 100 is not transmitting power, and the power transmission flag 700 is "0" (NO in step S1000).

Accordingly, the detection unit 103 updates Z_before to Z_init. Then, the first timer 107 is reset at time Ta1 (step S1002). When the first timer 107 times out at time Ta2 (YES in step S1003), the detection unit 103 transmits the pulse 506 in the period up to time Ta3 (step S1004). Then, the detection unit 103 performs Z-detection from Ta2 to Ta3 (step S1005).

Square 602 shows that the detection unit 103 performs Z-detection from time Ta2 to time Ta3, and the height of square 602 conceptually illustrates the magnitude of the impedance detected at that time. According to FIG. 6A, the height of square 602 is equal to Z_init. Accordingly, the detection unit 103 stores Z_init in Z_now (step S1006).

Row 1502 shows the information stored in the impedance storage unit 110 at this time. In row 1502, Z_before and Z_now are both equal to Z_init (YES in step S1011). Also, according to row 705, the power transmission flag 700 is "0" (NO in step S1012), the prohibit flag 703 is "0" (NO in step S1013), and the apparatus flag 704 is also "0" (NO in step S1016). Accordingly, the detection unit 103 once again resets the first timer 107 at time Ta3.

Next, it is presumed that the foreign substance 202 has entered the power transmission range 201 at time Ta4. That is to say, it is presumed that the state shown in FIG. 2B is entered at time Ta4. Square 604 shows that the foreign substance 202 is present in the power transmission range 201 from time Ta4 to time Ta1.

The detection unit 103 performs Z-detection from Ta5 to Ta6. Note that the Z-detection is set to time out at T6 using the first timer 107. The impedance detected at this time is indicated by square 603. The height of square 603 conceptually illustrates the magnitude of the impedance detected at this time, and here it is Z1. According to FIG. 6A, the height Z1 of the square 602 is not equal to Z_init.

Row 1503 shows the information stored in the impedance storage unit 110 at this time. In row 1503, Z_now and Z_before are not equal (NO in step S1011). Accordingly, the detection unit 103 determines that the foreign substance 202 or the power receiving apparatus 101 is present in the power transmission range 201 (step S1018).

The flags stored in the system state storage unit 105 at this time are as shown in row 705, and the power transmission flag 700 is "0" (NO in step S1019). Next, the detection unit 103 updates the suspend flag 701 to "1" (step S1020). The system state storage unit 105 at this time is as shown in row 706. According to row 706, the suspend flag 701 is "1", which means that the control unit 104 needs to identify which of the foreign substance 202 and the power receiving apparatus 101 is the cause of the impedance change. In order to perform the identification, the detection unit 103 starts the control unit 104 and the procedure moves to step S1100 (FIG. 11A).

Figure 11A:
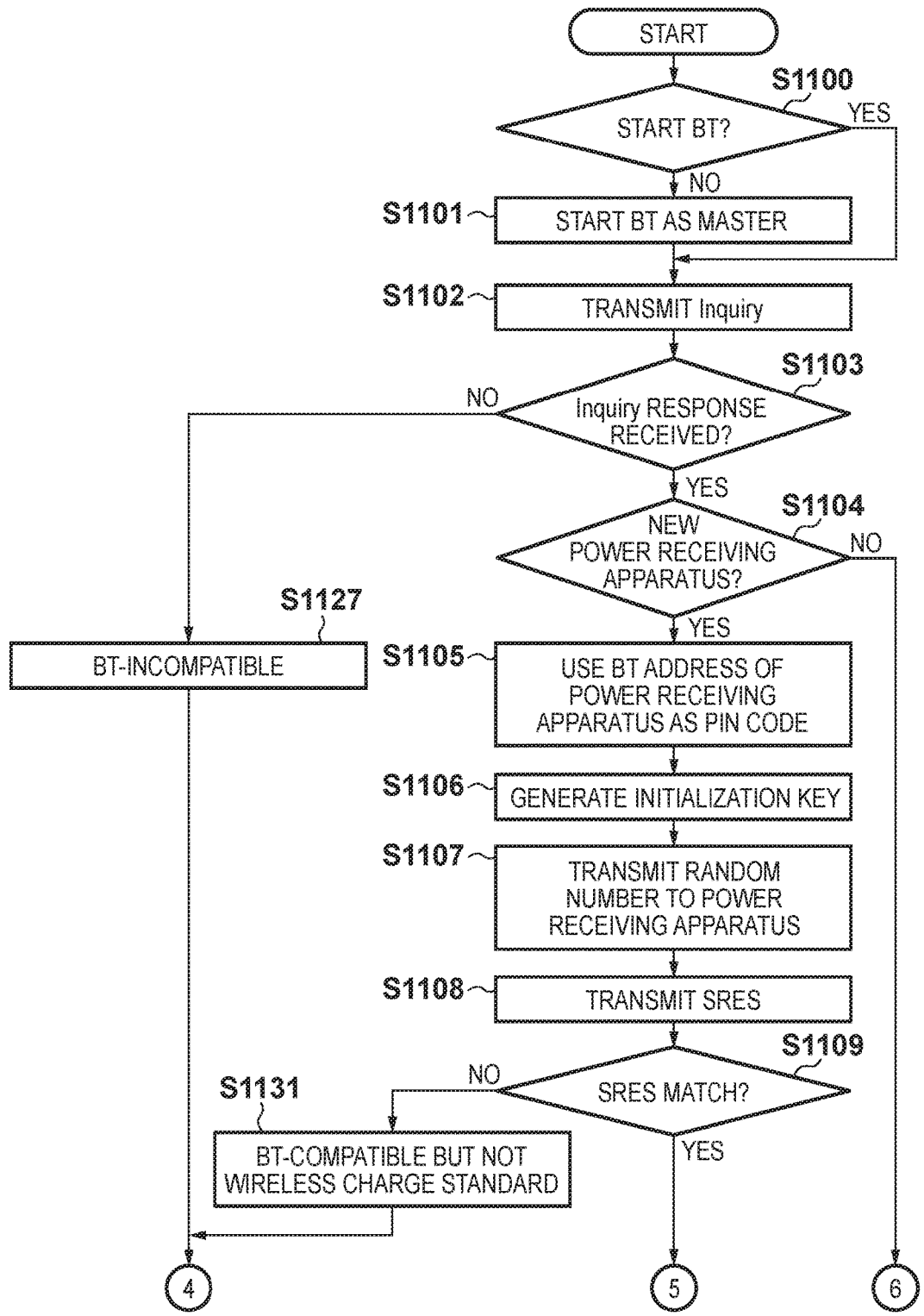
FIGS. 11A and 11B are flowcharts of operations for BT control in a power transmitting apparatus 100.
Figure 11B:
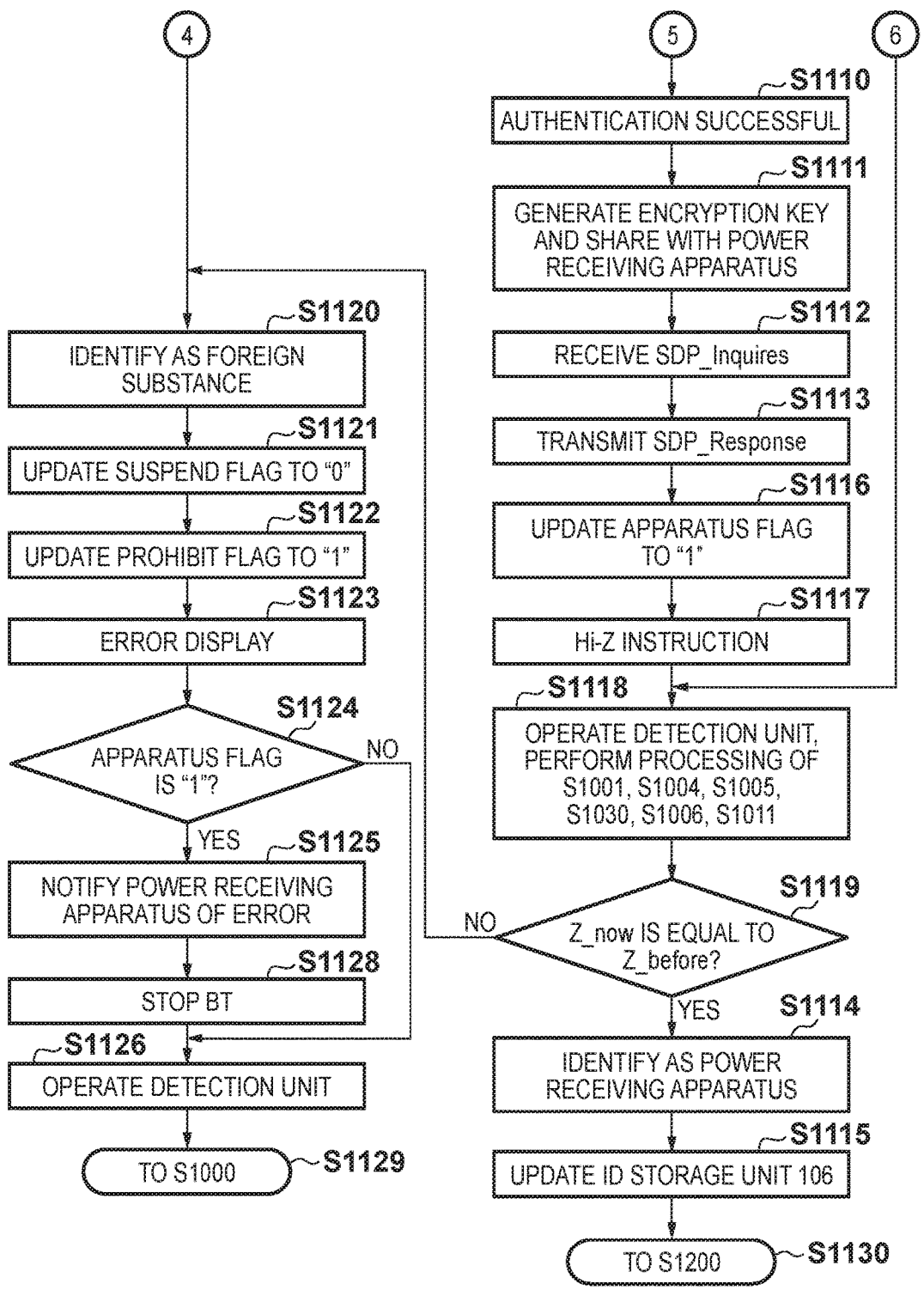

FIGS. 11A and 11B are a flowchart of operations for BT control in the power transmitting apparatus 100. The state here is the state shown in FIG. 2B, and the power receiving apparatus 101 is not present. For this reason, the BT (communication unit 116) of the power transmitting apparatus 100 has not been started (NO in step S1100). Accordingly, the control unit 104 starts the BT as the master (step S1101) and transmits an Inquiry message for performing inquiry of peripheral BT-compatible devices with the BT standard from the communication unit 116 (step S1102, 605).

Here, if the power receiving apparatus 101 is present, an Inquiry response message (response signal) that is a response to the Inquiry message is sent as a response. However, the foreign substance 202 does not respond to the Inquiry message, and therefore the control unit 104 does not receive the Inquiry response message (NO in step S1103). Accordingly, the control unit 104 determines that the cause of the impedance change detected from time Ta5 to Ta6 is not compatible with BT (step S1127), and determines that it is the foreign substance 202 (step S1120). Additionally, the suspend flag 701 is updated to "0" (step S1121) and the prohibit flag 703 is updated to "1" (step S1122).

Then, the control unit 104 performs error display on the display unit 112 so as to notify the user that the foreign substance 202 is present in the power transmission range 201, or that power transmission is prohibited (step S1123). The flags stored in the system state storage unit 105 at this time are as shown in row 707. The prohibit flag 703 is "1" since the foreign substance 202 is present in the power transmission range 201. According to row 707, the power receiving apparatus 101 is not connected by BT and the apparatus flag 704 is "0" (NO in step S1124). For this reason, the control unit 104 causes the detection unit 103 to operate in order to check that the foreign substance 202 has been removed from the power transmission range 201 (step S1126), and the processing returns to step S1000 (step S1129). Here, at Ta1, it is presumed that after viewing the error display, the user removes the foreign substance 202 from the power transmission range 201 for example.

From time Ta8 to time Ta9, the detection unit 103 transmits the pulse and performs Z-detection. Since the foreign substance 202 has been removed from the power transmission range 201, the state from Ta8 to Ta9 is the state shown in FIG. 2A, and the impedance storage unit 110 is as shown in row 1502. According to row 707, the prohibit flag 703 is "1" (YES in step S1013), and therefore the detection unit 103 determines that the foreign substance 202 has been removed (step S1017), the prohibit flag 703 is updated to "0", and thereafter the error display is switched off (step S1015). Then, the detection unit 103 returns to the processing of step S1000.

As described above, the output impedance of the DC voltage source for the class-E amplifier when a pulse is transmitted in the state where the foreign substance 202 and the power receiving apparatus are not present in the power transmission range 201 is stored by the detection unit 103 as Z_init. Also, the configuration is such that a pulse is periodically transmitted via a power transmitting antenna and the output impedance at that time is compared with the stored Z_init. Accordingly, by detecting the impedance change, the power transmitting apparatus 100 can recognize that at least one of the foreign substance 202 and the power receiving apparatus 101 is present in the power transmission range 201. Additionally, by recognizing that there is no response for an Inquiry message, the power transmitting apparatus 100 can recognize that the foreign substance 202 is present.

Note that in the description above, the detection unit 103 is configured to detect the output impedance of the DC voltage source 401, but it may be configured so as to detect another physical amount that changes due to the foreign substance 202 being electromagnetically coupled with the power transmitting antenna 115. For example, a configuration is possible where the voltage V1 of the power transmitting antenna 115 is detected. Also, the power transmitting apparatus 100 causes the communication unit 116 to operate as the BT master and transmits the Inquiry message denoted by 605. Therefore, a foreign substance that does not respond to an Inquiry message can be promptly identified. The inquiry message may be another packet for which a response from the power receiving apparatus 101 is expected. Also, the communication unit 116 may be configured to use a communication standard other than BT (e.g., wireless LAN).

Power Transmission System Operation Example 2 (Operation when Power Receiving Apparatus is Present)

FIG. 6B is a timing diagram for the power transmitting apparatus 100 and the power receiving apparatus 101 in the case where the power receiving apparatus 101 is present in the power transmission range 201. Note that the horizontal axis indicates time, and the vertical axis conceptually illustrates the impedance of the power receiving apparatus 101 seen by the power transmitting antenna 115.

Also, Hi-Z, Md-Z, and Zo (Hi-Z>Md-Z>Zo) are indicated as three predetermined impedance values. The control performed by the power receiving apparatus 101 for setting the impedance to the respective values is as described above. Square 610 indicates that the impedance of the power receiving apparatus 101 is Hi-Z from time Tb1 to Tb2. Square 611 indicates that the impedance of the power receiving apparatus 101 is Md-Z from time Tb2 to Tb3. Square 615 indicates that the impedance of the power receiving apparatus 101 is Zo from time Tb5 to Tb6.

Also, square 612 shows that the detection unit 103 transmits the pulse 506 and performs Z-detection from time Tb2 to Tb3 and that the Z-detection result is indicated by a dashed line 624. As is evident from comparing the dashed line 624 and Z_init, the impedance detected by the detection unit 103 from time Tb2 to time Tb3 is not equal to Z_init.

Figure 13A:
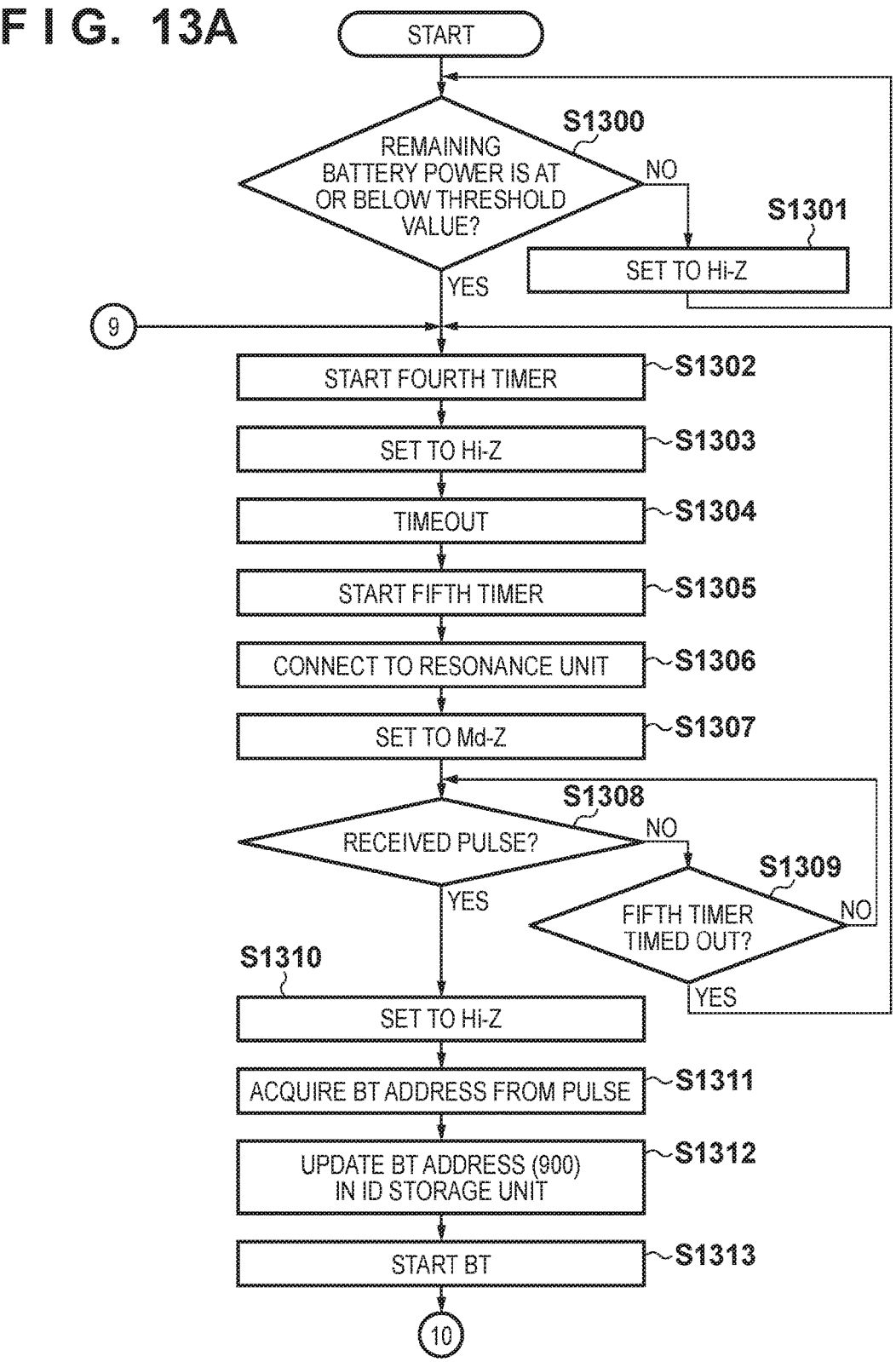
FIGS. 13A and 13B are flowcharts of operations for BT control in a power receiving apparatus 101.
Figure 13B:
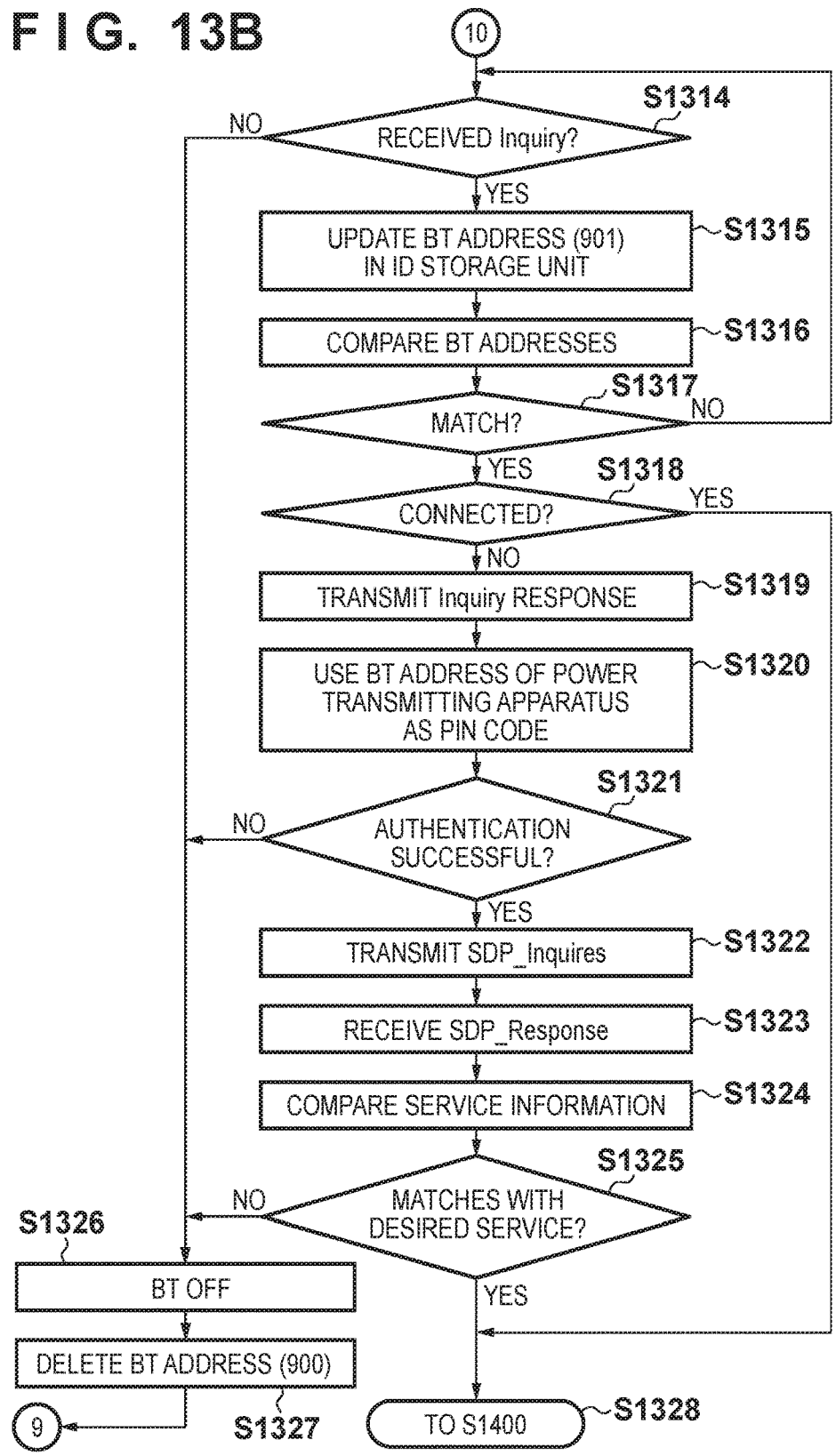

FIGS. 13A and 13B are a flowchart showing operations for BT control in the power receiving apparatus 101. If the remaining battery power is less than or equal to a predetermined threshold value (e.g., 95%) (YES in step S1300), the power receiving apparatus 101 starts the fourth timer 122 at time Tb1 (step S1302) and the impedance of the power receiving apparatus 101 is set to Hi-Z (step S1303).

When the fourth timer 122 times out at time Tb2 (step S1304), the power receiving apparatus 101 starts the fifth timer 123 (step S1305) and connects the switching unit 126 to the resonance unit 128 (step S1306). Then, the power receiving apparatus 101 connects the load switching unit 130 to the intermediate resistance 131 and the impedance of the power receiving apparatus 101 is set to Md-Z (step S1307).

The functions of the fourth timer 122 and the fifth timer 123 will be described here. The fourth timer 122 defines the amount of time that the impedance of the power receiving apparatus 101 is set to Hi-Z, and the fifth timer 123 defines the amount of time that it is set to Md-Z. In other words, if the power receiving apparatus 101 does not receive the pulse 506 from the power transmitting apparatus 100 (NO in later-described step S1308), the power receiving apparatus 101 changes the state to Hi-Z and Md-Z repeatedly.

The detection unit 103 detects an impedance that is different from Z_init from time Tb2 to Tb3. Because of this, the detection unit 103 recognizes that the foreign substance 202 or the power receiving apparatus 101 is present in the power transmission range 201.

Here, since the power receiving apparatus 101 has set the impedance to Md-Z, a microcurrent flows in the intermediate resistance 131 due to the pulse 506 (i.e., the detection signal 502 and the BT address signal 503) transmitted by the power transmission unit 113 from Tb2 to Tb3. In view of this, the power receiving apparatus 101 can acquire the BT address of the power transmitting apparatus 100 that is included in the BT address signal 503 by detecting the voltage generated at both terminals of the intermediate resistance 131. At this time, the power receiving apparatus 101 can recognize its own presence in the power transmission range 201 of the power transmitting apparatus 100.

If the power receiving apparatus 101 receives the pulse 506 (control signal) (YES in step S1308), the impedance of the power receiving apparatus 101 is immediately set to Hi-Z at time Tb3 (step S1310), regardless of whether or not the fifth timer 123 has timed out, in the interest of the aforementioned circuit protection.

Then, the power receiving apparatus 101 stores (updates) the BT address of the power transmitting apparatus 100 acquired in step S1311 in the storage region 900 of the ID storage unit 121 (step S1312). Here, the BT address (identifier) of the power transmitting apparatus 100 that was acquired from the pulse 506 is "aa aa aa aa aa aa". Then, the power receiving apparatus 101 starts the BT (communication unit 119) (step S1313).

Meanwhile, upon detecting that the impedance has changed around time Tb3, the power transmitting apparatus 100 starts the BT (communication unit 116) (step S1101) and transmits the Inquiry message (step S1102, 605).

Upon receiving the Inquiry message (YES in step S1314), the power receiving apparatus 101 acquires the BT address of the transmission source device stored in the header portion of the Inquiry message and stores (updates) it in the storage region 901 of the ID storage unit 121. Then, the power receiving apparatus 101 compares the two BT addresses stored in the storage regions 900 and 901 of the ID storage unit 121 (step S1316).

FIG. 9 shows the two BT addresses stored in the ID storage unit 121 at this time. According to FIG. 9, the BT address in the storage region 900 and the BT address in the storage region 901 both match the BT address of the power transmitting apparatus 100 (YES in step S1317). In view of this, in step S1318, the power receiving apparatus 101 determines whether or not connection to the device corresponding to the BT address stored in the ID storage unit 121 is complete. Here, BT connection has not yet been performed (NO in step S1318). For this reason, the power receiving apparatus 101 transmits the Inquiry response message (response signal) (step S1319, 613) in response to the Inquiry message transmitted by the device corresponding to a BT address stored in the ID storage unit 121 (in this case, the power transmitting apparatus 100) (response signal transmission means). In other words, the power receiving apparatus recognizes its own presence in the power transmission range 201 and subsequently transmits an Inquiry response message (response signal).

Upon receiving the Inquiry response message denoted by 613 (YES in step S1103), the power transmitting apparatus 100 determines whether or not the transmission source of the Inquiry response message is a device that has not been connected by BT. Here, since the power transmitting apparatus 100 and the power receiving apparatus 101 have not been connected by BT (YES in step S1104), the power transmitting apparatus 100 performs authentication processing for the power receiving apparatus 101.

Incidentally, a PIN code is used in BT authentication, and authentication is successful if the PIN code used by the power receiving apparatus 101 is the same as that in the power transmitting apparatus 100. In view of this, the power transmitting apparatus 100 uses its own BT address as the PIN code for example (step S1105). Also, the power receiving apparatus 101 uses the BT address of the power transmitting apparatus 100 that was acquired from the pulse 506 in step S1311 as the PIN code (step S1320). Because the PIN codes have been made common to the power transmitting apparatus 100 and the power receiving apparatus 101, authentication is successful, and the same encryption key can be shared.

The power transmitting apparatus 100 generates an initialization key based on the BT authentication procedure (step S1106) and transmits a random number generated in the power transmitting apparatus 100 to the power receiving apparatus 101 (not shown). Upon receiving the random number, the power receiving apparatus 101 generates an initialization key based on the PIN code and the random number.

Next, the power transmitting apparatus 100 transmits the newly-generated random number to the power receiving apparatus (step S1107). Upon receiving the random number in step S1107, the power receiving apparatus 101 generates an SRES (Signal Response) message based on the random number, the BT address of the power transmitting apparatus 100, and the initialization key and transmits the SRES message to the power transmitting apparatus 100.

Upon receiving the SRES message (step S1108), the power transmitting apparatus 100 compares the SRES message with its own generated SRES message (step S1109). As described above, the PIN code is used in common by the power transmitting apparatus 100 and the power receiving apparatus 101, and therefore the SRES messages match (YES in step S1109), and the authentication is successful (step S1110, YES in step S1321).

Next, the power receiving apparatus 101 transmits an SDP (Service Discovery Protocol) inquires message (step S1322). Upon receiving the SDP inquires message (step S1112), the power transmitting apparatus 100 transmits an SDP response message including "Wireless Charger", which is information regarding a service that can be provided (step S1113). Upon receiving the SDP response message (step S1323), the power receiving apparatus 101 checks whether or not the desired service and the service acquired in step S1323 match (step S1324). Here, the power receiving apparatus 101 has requested the "Wireless Charger" service for charging the battery, which is the load 118, and therefore it is determined that the services match (YES in step S1325).

Since the BT connection with the power receiving apparatus 101 was successful, the control unit 104 updates the apparatus flag 704 to "1" (step S1116). Then, the control unit 104 instructs the power receiving apparatus 101 to set the impedance to Hi-Z in order to determine whether or not the foreign substance 202 is present in the power transmission range 201 (step S1117). Next, the control unit 104 causes the detection unit 103 to operate, performs the processing of the above-described steps S1001, S1004, S1005, S1030, and S1006, and compares the result with the content of the impedance storage unit 110 (step S1118).

Here, it is presumed that from time Tb4 to Tb5, the power transmission unit 113 has transmitted the pulse 506 transmitted in step S1004. Here, the state is that shown in FIG. 2C, and the foreign substance 202 is not present in the power transmission range 201. For this reason, the impedance detected by the detection unit 103 from time Ta4 to time Ta5 is equal to Z_init (YES in step S1119). For this reason, the control unit 104 determines that the power receiving apparatus 101 is the cause of the impedance change detected from time Tb2 to time Tb3 (step S1114) and updates the BT address in the storage region 800 of the ID storage unit 106 to the BT address of the power receiving apparatus 101 (step S1115). Note that the BT address of the power receiving apparatus 101 can be acquired from the header or the like of the SDP response message received in step S1112. Here, the BT address (identifier) of the power receiving apparatus 101 is "bb bb bb bb bb bb".

Figure 12A:
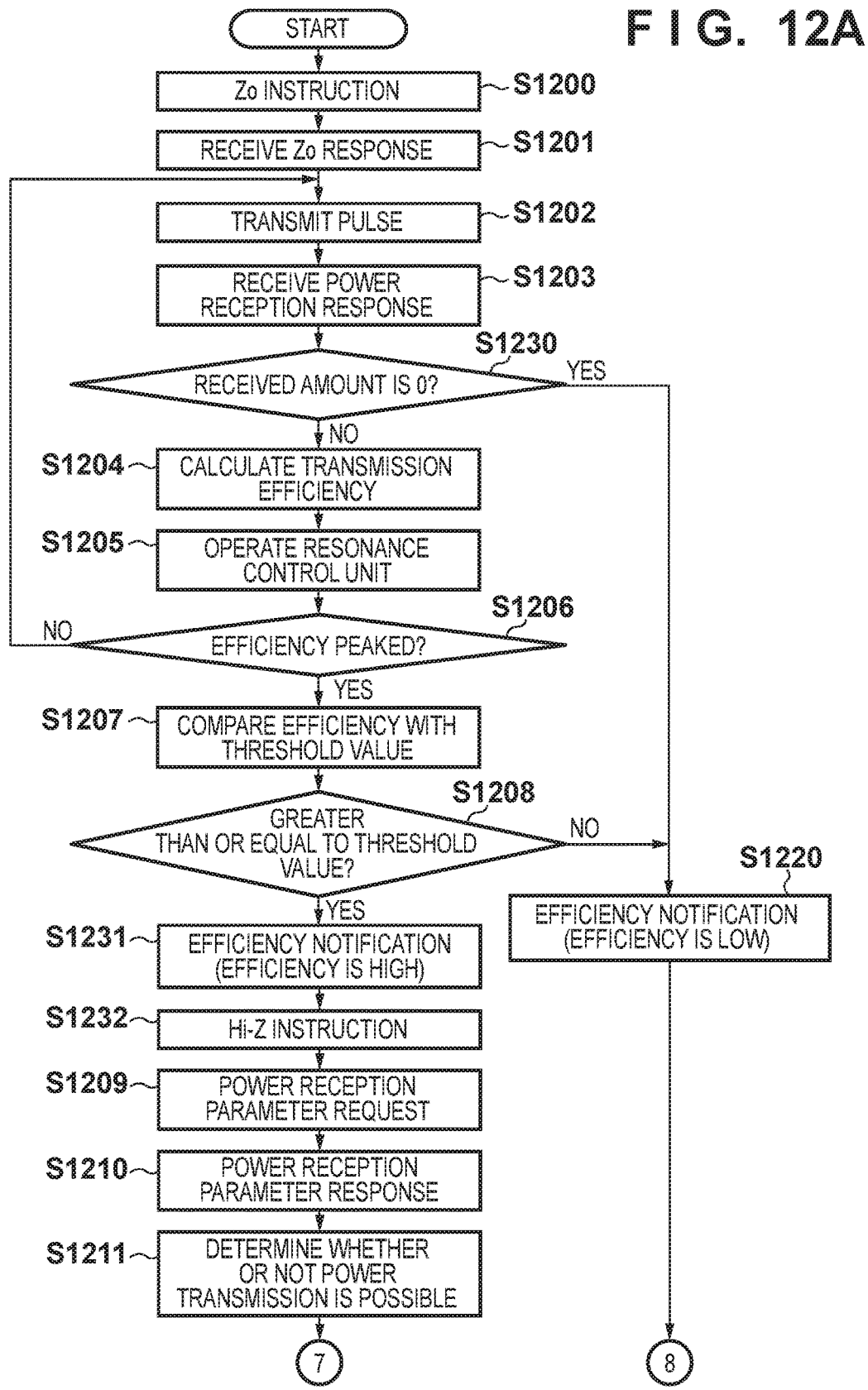
FIGS. 12A and 12B are flowcharts of operations for power transmission control in the power transmitting apparatus 100.
Figure 12B:
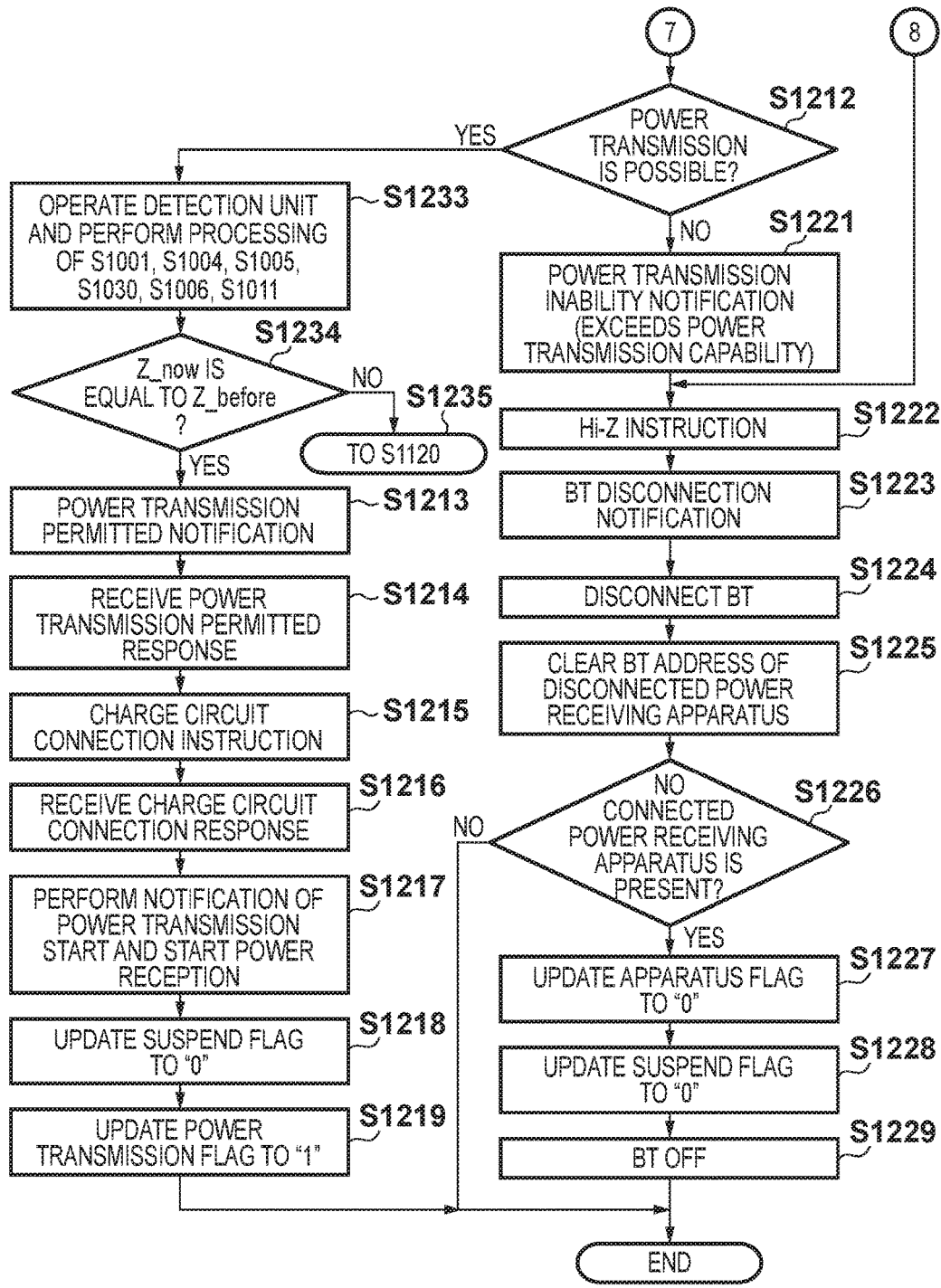
Figure 14A:
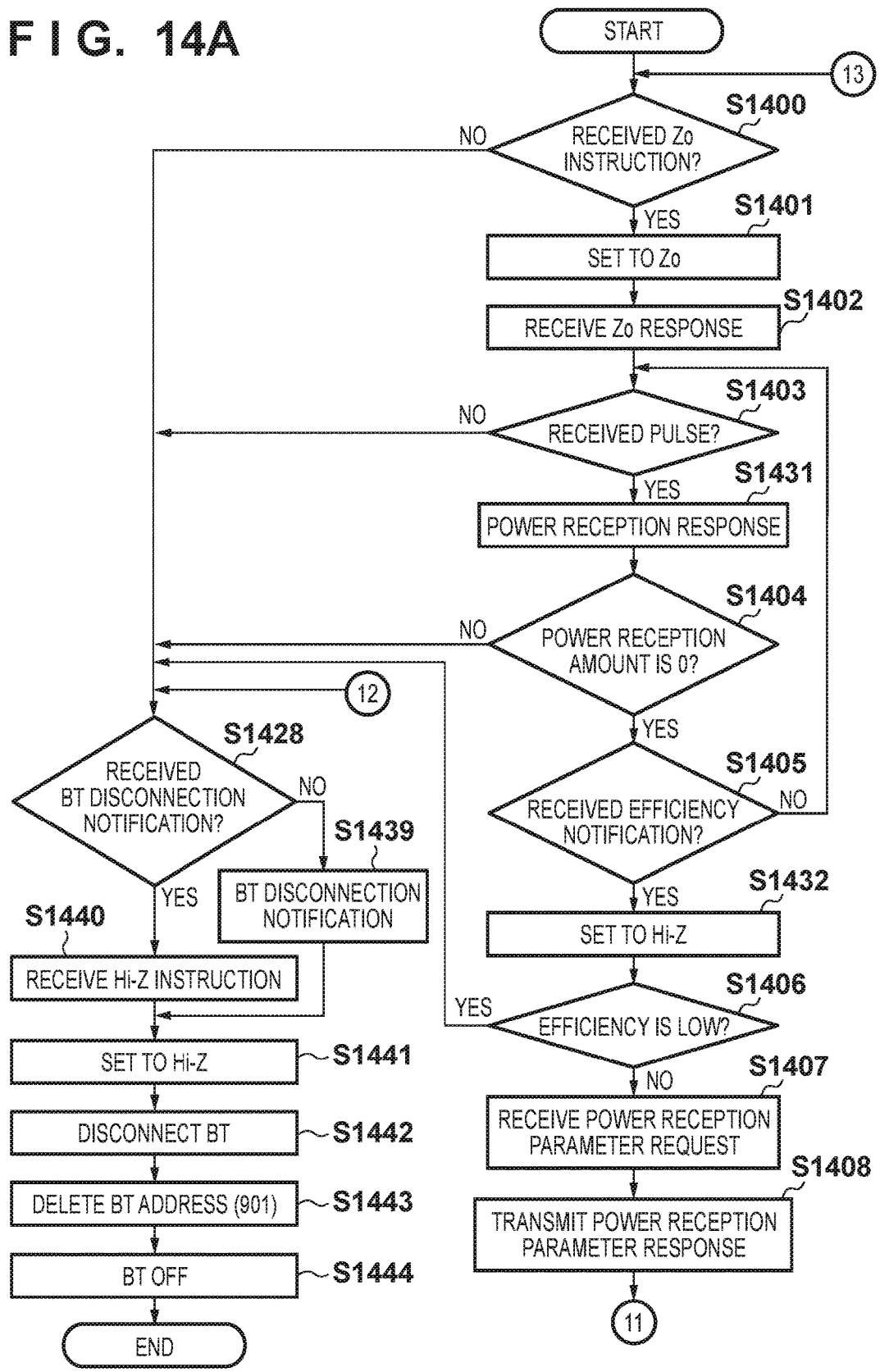
FIGS. 14A and 14B are flowcharts of operations for power reception control in the power receiving apparatus 101.
Figure 14B:
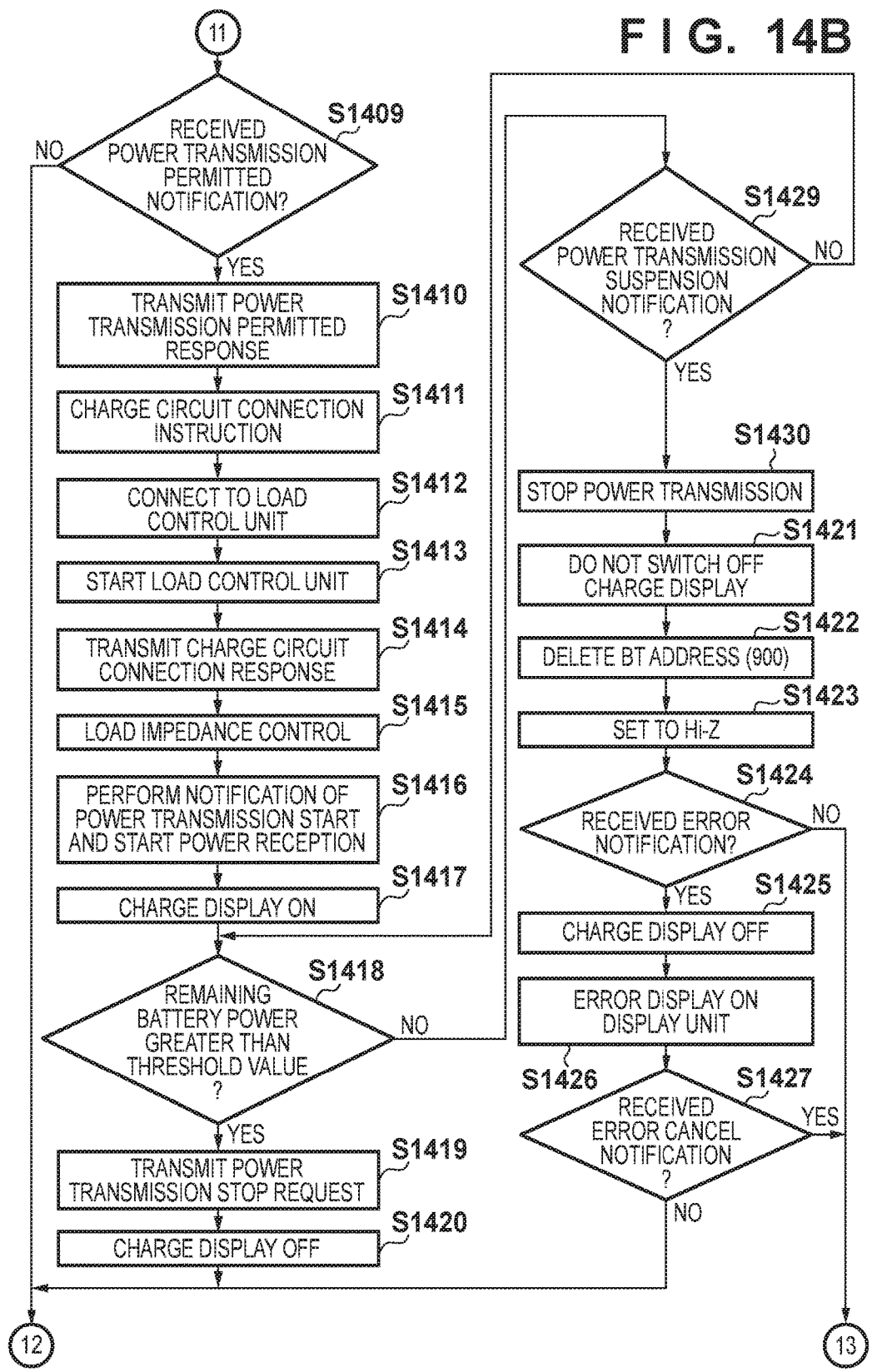

FIGS. 12A and 12B are a flowchart of operations for power transmission control in the power transmitting apparatus 100. FIGS. 14A and 14B are a flowchart of operations for power reception control in the power receiving apparatus 101.

First, at time Tb4, the control unit 104 transmits an instruction to change the impedance to Zo (Zo instruction) to the power receiving apparatus 101 in order to calculate the transmission efficiency between the power transmitting antenna 115 and the power receiving antenna 125 (step S1200, 614). Upon receiving the Zo instruction (YES in step S1400), the power receiving apparatus 101 sets the impedance of the power receiving apparatus 101 to Zo (step S1401) and transmits a Zo instruction response indicating that the impedance has been set to Zo to the power transmitting apparatus 100 (step S1402).

Upon receiving the Zo instruction response (step S1201), the control unit 104 transmits the pulse 506 from the power transmitting antenna 115 (step S1202). Upon receiving the pulse (YES in step S1403), the power receiving apparatus 101 transmits a power reception response indicating a voltage value or a power value to the power transmitting apparatus 100 (step S1431).

If the power reception response received in step S1203 is not zero (NO in step S1230), the control unit 104 derives the transmission efficiency (step S1204), causes the resonance control unit 114 to operate (step S1205), and controls the resonance control unit 114 such that the transmission efficiency peaks. If the transmission efficiency peaks (YES in step S1205), the transmission efficiency and the threshold value that was stored in advance are compared (step S1207). If the transmission efficiency is greater than or equal to the threshold value (YES in step S1208), the control unit 104 transmits an efficiency notification (efficiency is high) to the power receiving apparatus 101 (step S1231) and transmits the Hi-Z instruction (step S1232, 616). In this case, the pulse transmission for the efficiency calculation (step S1202) is not performed thereafter. Upon receiving the efficiency notification (YES in step S1405), the power receiving apparatus 101 sets the impedance to Hi-Z (step S1432), and transmits a Hi-Z instruction response indicating that the Hi-Z instruction was received and the impedance was set to Hi-Z to the power transmitting apparatus 100. Note that if the efficiency is less than the threshold value (NO in step S1208), it is sufficient that control is performed such that an efficiency notification (efficiency is low) is transmitted (step S1220) and power transmission is not performed.

Next, the control unit 104 makes a request to the power receiving apparatus 101 to receive power reception parameters that indicate the power amount requested by the power receiving apparatus 101, the peak voltage allowable by the power reception unit 117, and the like (step S1209), and the power receiving apparatus 101 responds to the request (step S1408). The control unit 104 compares the power reception parameters acquired in step S1210 and its own power transmission capability and determines whether or not power transmission is possible (step S1211). Then, if power transmission is possible (YES in step S1212), the control unit 104 causes the detection unit 103 to operate, performs the processing of the above-described steps S1001, S1004, S1005, S1030, S1006, and S1011, and compares the result with the content of the impedance storage unit 110 (step S1233).

Here, it is presumed that from time Tb6 to Tb7, the power transmission unit 113 has transmitted the pulse 506 transmitted in step S1004. Since the foreign substance 202 is not present in the power transmission range 201 in the state shown in FIG. 2C, the impedance detected by the detection unit 103 from time Ta6 to time Ta1 is equal to Z_init (YES in step S1234). Because of this, the control unit 104 transmits a power transmission permitted notification to the power receiving apparatus 101 (step S1213), and upon receiving a power transmission permitted response (step S1214), the control unit 104 instructs the power receiving apparatus 101 to connect to the charge circuit (step S1215).

Note that the detection unit 103 is operated from time Ta6 to Ta1 because there is a possibility that the foreign substance 202 enters the power transmission range 201 in the period from Tb5 to Tb6. In this way, before starting power transmission, the control unit 104 always causes the detection unit 103 to operate and checks that there is no foreign substance 202.

Upon receiving the power transmission permitted notification (YES in step S1409), the power receiving apparatus 101 transmits the power transmission permitted response (step S1410). Then, the power receiving apparatus 101 receives a charge circuit connection instruction (step S1411) and connects the load switching unit 130 to the load control unit 133 (step S1412). Furthermore, the power receiving apparatus 101 starts the load control unit 133 (step S1413) and transmits a charge circuit connection response (step S1414).

Upon receiving the charge circuit connection response (step S1216), the control unit 104 performs notification of the start of power transmission and starts power transmission at time Tb7 (step S1217, 617). Then, the control unit 104 updates the suspend flag 701 to "0" (step S1218) and updates the power transmission flag 700 to "1" (step S1219).

The power receiving apparatus 101 starts load impedance control (step S1415), starts power reception upon receiving the power transmission start notification (step S1416), and displays the fact that charging is being performed on the display unit 124. At this time, the state is that shown in FIG. 2D, and the system state storage unit 105 is in a state where the flags shown in row 708 have been stored.

From time Tb7 and onward, the impedance of the power receiving apparatus 101 is constant at Zo. Since the power transmission unit 113 uses a class-E amplifier, the impedance of the DC voltage source detected by the detection unit 103 is constant as well. Here, Z_tx is the impedance of the DC voltage source when the power transmitting apparatus 100 is transmitting power from Tb7 onward, and square 618 indicates Z_tx.

Upon starting power transmission (YES in step S1000), the power transmitting apparatus 100 resets the second timer that times out in a micro-period (e.g., several milliseconds) that is shorter than that of the first timer. Then, when the second timer has timed out, the power transmitting apparatus performs Z-detection.

Here, if the foreign substance 202 has entered the power transmission range 201 while power transmission is in progress, the result of the Z-detection will be a value that is different from Z_tx due to the influence of the foreign substance 202. At this time, the control unit 104 recognizes that the foreign substance 202 or a new power receiving apparatus that is not shown in FIG. 2D has entered the power transmission range 201, or that the power receiving apparatus 101 has moved outside of the power transmission range 201 and the impedance has changed. The power transmitting apparatus 100 performs the following processing and determines whether the cause of the impedance change is the foreign substance 202, a new power receiving apparatus, or movement of the power receiving apparatus 101.

Since the power transmission flag is "1" (YES in step S1019), the power transmitting apparatus 100 transmits a power transmission suspension notification to the power receiving apparatus 101 indicating that power transmission is to be interrupted until the determination ends (step S1025). Then, the power transmission flag is updated to "0" (step S1027) and power transmission stops (step S1026). Then, the power transmitting apparatus 100 transmits the Hi-Z instruction to the power receiving apparatus 101 (step S1028).

Upon receiving the power transmission suspension notification (YES in step S1429), the power receiving apparatus 100 transmits a power transmission suspension notification response. At this time, the power receiving apparatus 101 recognizes that power transmission has been suspended since the power transmitting apparatus 100 is to perform the determination, or that the power receiving apparatus 101 itself has moved outside of the power transmission range 201. Also, when power transmission is stopped (step S1430), the power receiving apparatus 101 no longer recognizes whether or not it is in the power transmission range 201, and therefore the BT address stored in the storage region 900 is deleted (step S1422). Also, upon receiving the power transmission suspension notification, the power receiving apparatus 101 does not switch off the charge display (step S1421), regardless of the fact that power transmission has been stopped. Then, when the Hi-Z instruction is received, the impedance is set to Hi-Z (step S1423) and the Hi-Z instruction response is subsequently transmitted.

Upon receiving the Hi-Z instruction response (YES in step S1029), the power transmitting apparatus 100 updates the suspend flag 701 to "1" (step S1020). Then, the power transmitting apparatus 100 returns to the processing of step S1100 in order to perform the identification (step S1023). At this time, the system state storage unit 105 is in the state in which the flags shown in row 709 are stored.

Since the impedance of the power receiving apparatus 101 is Hi-Z at this time, the Z-detection performed by the power transmitting apparatus 100 is not influenced by the power receiving apparatus. Accordingly, the power transmitting apparatus 100 detects the foreign substance 202 using the processing that was described above with reference to FIG. 2A (step S1120). Since the apparatus flag 704 is "1" (YES in step S1126), the power transmitting apparatus 100 transmits an error notification to the power receiving apparatus 101 (step S1126). The system state storage unit 105 at this time is in the state in which the flags shown in row 710 are stored. Upon receiving the error notification (YES in step S1424), the power receiving apparatus 101 switches off the charge display (step S1425) and performs error display on the display unit 124 (step S1426).

The power transmitting apparatus 100 causes the detection unit to operate in step S1126 and moves to the processing of step S1000 (steps S1126, S1129), and therefore, as described above with reference to FIG. 2A, it is possible to detect that the foreign substance 202 has been removed.

When the foreign substance 202 has been removed, the apparatus flag 704 is "1" (YES in step S1016), and therefore the power transmitting apparatus 100 transmits an error cancel notification to the power receiving apparatus (step S1021). Upon receiving the error notification (YES in step S1427), the power receiving apparatus 101 moves to step S1400 and waits for the Zo instruction. Thereafter, the power transmitting apparatus 100 starts power transmission using the processing that was described with reference to FIG. 6B.

Also, if a new power receiving apparatus has entered the power transmission range 201 while power transmission is in progress, the Z-detection result will indicate a value that is different from Z_tx due to the influence of the new power receiving apparatus. Because of this, the power transmitting apparatus 100 can detect the new power receiving apparatus using the processing that was described above with reference to FIG. 2B. Then, in step S1200, a Zo instruction is given for all of the BT addresses stored in the storage region 800 at this time. In other words, the Zo instruction is given for the BT address of the power receiving apparatus 101 and the BT address of the new power receiving apparatus. Then, the power transmitting apparatus 100 starts transmitting power to the power receiving apparatus 101 and the new power receiving apparatus. In step S1421, it is sufficient that the power receiving apparatus 101 does not switch off the charge display while the power transmitting apparatus 100 is performing the determination, or in other words, when there is a possibility of being able to continue to receiving power regardless of the fact that power transmission has been stopped. Accordingly, if new power receiving apparatuses frequently enter the power transmission range 201, the charge display is not switched off each time, and the user of the power receiving apparatus 101 need not worry that charging is not being performed.

Note that if another BT device that can respond to the Inquiry message but does not have shared information is present in the power transmission range 201 for example, a negative determination is made in step S1109, and the power transmitting apparatus 100 determines that the other BT device is a foreign substance (step S1120).

As described above, in the wireless power transmission system according to the first embodiment, the output impedance of the DC voltage source 401 in the state where the foreign substance 202 and the power receiving apparatus 101 are not present in the power transmission range 201 (initial state) is stored as Z_init by the detection unit 103. Then, by periodically transmitting a pulse via the power transmitting antenna 115 and comparing the output impedance at that time and Z_init, it is possible to realize foreign substance detection without the addition of a special circuit.

Also, the power receiving apparatus 101 has a function of controlling the impedance. Due to the power receiving apparatus 101 controlling the impedance in accordance with instructions from the power transmitting apparatus 100, the power transmitting apparatus 100 can identify which of the foreign substance 202 and the power receiving apparatus 101 is present in the power transmission range 201. Also, the power transmitting apparatus 100 can transmit power to the power receiving apparatus 101 with a more preferable transmission efficiency.

Also, if Z_init and Z_before are not equal in step S1234 (NO in step S1234), the power transmitting apparatus determines that a foreign substance is present (steps S1235, S1120) and prohibits power transmission. By doing so, power transmission can be prohibited when a foreign substance has entered the power transmission range in the period from time Tb5 to Tb6.

Also, if the SRES messages do not match, the power transmitting apparatus determines that a foreign substance is present and prohibits power transmission. This corresponds to the case where a BT device that cannot receive the Wireless Charger service enters the power transmission range and BT authentication processing is performed. In that case, the power transmitting apparatus can consider the BT device as being equal to a foreign substance and not perform power transmission thereto.

Also, if the power receiving apparatus does not transmit an expected response, communication by means of BT may be stopped. The case where the Zo instruction response is not received from the power receiving apparatus and the case where the power reception parameter response is not received are examples of cases where an expected response is not transmitted.

Also, another example of this is the case where the power transmitting apparatus is configured to transmit a power transmission ability determination notification in step S1212 regardless of the determination result and the power receiving apparatus is configured to transmit a power transmission ability determination response in response to the notification, but the power transmitting apparatus does not receive the power transmission ability determination response. Alternatively, other examples of this are the case where the power transmitting apparatus does not receive the power transmission permitted response, and the case where the power transmitting apparatus does not receive the charge circuit connection response.

Furthermore, other examples are the case where the power receiving apparatus is configured to transmit a power transmission start notification response in response to a power transmission start notification, but the power transmission start response is not received, or the Hi-Z instruction response is not received. Also, another example is the case where the power receiving apparatus is configured to transmit an error notification response in response to an error notification, but the power transmitting apparatus does not receive the error notification response. Also, another example is the case where the power receiving apparatus is configured to transmit an error cancel notification response in response to an error cancel notification, but the power transmitting apparatus does not receive the error cancel notification response. Also, another example is the case where the power receiving apparatus is configured to transmit an efficiency notification response in response to an efficiency notification, but the efficiency notification response is not received.

In the above cases, it is conceivable that the power receiving apparatus has been moved outside of the communication range for some reason, that the power receiving apparatus has malfunctioned, that the communication unit of the power transmitting apparatus has malfunctioned, or the like. Also, the power transmitting apparatus may be configured to stop or prohibit power transmission also in the case where BT communication has been disconnected due to deterioration in the communication environment or the like. By doing so, power transmission can be stopped or prohibited in the case where control signals can no longer be exchanged.

Also, if the power transmitting apparatus does not execute the next expected processing, the power receiving apparatus may disconnect from BT, delete the BT address from the storage region 901, and subsequently stop BT. The case where the power receiving apparatus does not receive the power transmission ability determination, the case where the Hi-Z instruction is not received, the case where the power transmission permitted notification is not received, and the case where the charge circuit connection instruction is not received are examples of cases where the power transmitting apparatus does not perform the expected processing.

Also, another example is the case where the power receiving apparatus is configured to detect the power reception amount received from the power transmitting apparatus, and the power transmission suspension notification is not received regardless of the fact that the power reception amount is 0. Also, another example is the case where the power receiving apparatus does not receive the pulse in step S1403 (NO in step S1403). Note that if the pulse is not received in step S1403 (NO in step S1403), before disconnecting BT, the power receiving apparatus may transmit a power reception inability notification to the power transmitting apparatus indicating that the pulse was not received.

The case where the power receiving apparatus that is present in the power transmission range is taken or moved outside of the power transmission range and the case of malfunction in the power receiving apparatus or the power transmitting apparatus are examples that also correspond to the above cases. Thus, it is possible to handle cases where unexpected circumstances arise in the power transmitting apparatus and the power receiving apparatus.

Also, due to the configuration where the second timer is set to a micro-period, the entry of the foreign substance 202 into the power transmission range 201 can be immediately detected and power transmission can be promptly stopped. Also, by setting the first timer to a longer time period than the second timer, it is possible to achieve low power consumption in the power transmitting apparatus in the state where power transmission is not being performed, or where the BT has not been started.

Also, if the Inquiry message response has been received, the power transmitting apparatus checks whether or not the foreign substance is present in the power transmission range by setting the impedance of the power receiving apparatus to Hi-Z. By doing so, the error notification can be transmitted to the power receiving apparatus and notification of the fact that power transmission is prohibited can be performed in the case where the foreign substance is present.

Also, the power transmitting apparatus performs Z-detection before the efficiency calculation. By doing so, the foreign substance can be detected before the efficiency calculation is performed, and the efficiency calculation can be performed with accuracy. Also, Z-detection is performed before the start of power transmission, and therefore, if a foreign substance has entered the power transmission range in the period from time Tb5 to Tb6, the power transmitting apparatus can recognize the entry of the foreign substance before the start of power transmission.

In addition, even when the power transmission suspension notification is received in step S1429 and power reception is interrupted, the power receiving apparatus does not switch off the charge display until the error notification is received. By doing so, the charge display can remain on in the case where there is a possibility that power reception can continue, even if power reception has been interrupted. In other words, in the case where multiple power receiving apparatuses enter the power transmission range 201 one after another, the charge display is not switched off each time.

Also, upon recognizing its own presence in the power transmission range 201, the power receiving apparatus performs BT authentication processing. By doing so, after the BT authentication for the power receiving apparatus is successful, the power transmitting apparatus can recognize that the power receiving apparatus is present in the power transmission range 201. Also, since the power receiving apparatus first recognizes its own presence in the power transmission range and then transmits the Inquiry response message, the power transmitting apparatus can recognize that the power receiving apparatus that transmitted the Inquiry response message is present in the power transmission range. Accordingly, the power transmitting apparatus can realize communication control with the power receiving apparatus that is present in the power transmission range 201.

Also, the power transmitting apparatus performs notification of its own BT address via the power transmitting antenna used in the power transmission range 201 that is smaller than the communication range 200. Then, the power receiving apparatus performs authentication processing with only the power transmitting apparatus having the BT address that was acquired using the power receiving antenna. By doing so, the power receiving apparatus can avoid the problem of connecting via BT to another adjacent power transmitting apparatus.

Also, if the next expected instruction or notification is not received from the power transmitting apparatus, the power receiving apparatus stops the communication unit. By doing so, system malfunction can be prevented. Also, if an expected response is not received from the power receiving apparatus, the power transmitting apparatus also stops a communication unit and stops the power transmission sequence. By doing so, system malfunction can be prevented.

Also, the power transmitting apparatus starts the communication unit after detecting an impedance change. By doing so, power is not supplied needlessly to the communication unit and low power consumption can be realized.

Also, if the remaining battery power is greater than a threshold value (NO in step S1300, YES in step S1418), the power receiving apparatus sets the impedance to Hi-Z (steps S1301, S1431). By doing so, a power receiving apparatus that does not need to be charged will not influence the Z-detection executed by the power transmitting apparatus 100. Also, if the remaining battery power is greater than the threshold value (NO in step S1300, YES in step S1418), the power receiving apparatus does not connect to the power transmitting apparatus by BT, and it is possible to achieve power conservation in the power receiving apparatus and the power transmitting apparatus.

Modified Example 1

Other configurations will be described below, and similar effects can also be obtained with any of these configurations or a combination thereof below.

The high resistance may be a capacitor indicating a high impedance in the frequency of a high-frequency voltage generated in the power receiving antenna. It is also conceivable to not include the high resistance 127. In that case, the power receiving antenna is in an open state, and there is no current flowing in the power receiving antenna. In other words, the impedance of the power receiving antenna can be set to an extremely high value. Also, Z_init need not be a fixed value and may be a value obtained by giving a margin of error to a fixed value. For example, similar effects can also be obtained with a value of 100 ohms±3%.

Also, the pulse was described as having a configuration where the detection signal 502 and the BT address signal 503 are combined, but it is possible to use only the BT address signal 503. Also, the power transmitting apparatus is configured to transmit the pulse intermittently, but similar effects can be obtained using a configuration of continuous transmission as well.

Also, after transmitting the error cancel notification (step S1021), the power transmitting apparatus may transmit an Md-Z instruction for setting the impedance to Md-Z to the power receiving apparatus, and the power receiving apparatus may set the impedance to Md-Z. By doing so, the power receiving apparatus can recognize whether or not it is present in the power transmission range 201, and therefore system malfunction can be prevented.

Also, in the description above, the power transmitting apparatus notifies its own BT address to the power receiving apparatus via the power transmitting antenna. It is also possible to perform notification of a BT address on which a specific arithmetic operation has been carried out. Due to the power transmitting apparatus and the power receiving apparatus sharing the specific arithmetic operation, a similar effect can be obtained and security is improved. Examples of the specific arithmetic operation include a method of finding the exclusive OR of a predetermined 6-byte bit string and the bit string of the BT address (6 bytes).

Additionally, it is also possible to transmit a pulse including the addition of the PIN code, rather than a pulse including only the BT address. Using a configuration where the PIN code is changed as appropriate increases the complexity of the encryption key and increases security.

Also, in the description above, the power transmitting apparatus notifies its own BT address to the power receiving apparatus via the power transmitting antenna. The BT address may be other information by which the power transmitting apparatus can be identified. For example, the BT address may be a random number generated randomly by the power transmitting apparatus. In this case, the power transmitting apparatus transmits the random number from time Tb2 to Tb3 and attaches the random number to the Inquiry message. Then, a similar effect can be obtained also when the power receiving apparatus compares the received random number and the random number attached to the Inquiry from time Tb2 to Tb3 in step S1316.

Also, in the BT authentication and encryption key generation processing, the power receiving apparatus may include an information element indicating that it can receive the Wireless Charger service in the Inquiry response message and transmit this Inquiry response message to the power transmitting apparatus as a response. For example, the power receiving apparatus may include "Wireless Power Receiver" as the information element. By performing authentication processing with only the transmission source of the response including the information element among the received Inquiry responses, the power transmitting apparatus can avoid performing needless authentication processing with a BT device that cannot receive the Wireless Charger service.

Also, in the above description, the power transmitting apparatus operates as the master device and the power receiving apparatus determines whether or not to transmit the Inquiry response based on the address of the Inquiry transmission source. However, another packet that is exchanged before the encryption key is shared in step S1111, or in other words, another packet that is expected as a response from the slave device may be used. For example, an ID packet that is exchanged at the time of calling (Page) may be used.

Also, the BT address signal 503 is configured to be transmitted by the power transmitting apparatus, but a configuration is possible where the power receiving apparatus transmits its own BT address. In this case, the power receiving apparatus controls the connection between an antenna switching switch and the resonance unit for example, and thereby modulates the load according to the pulse transmitted by the power transmitting apparatus. This changes the impedance when the power receiving apparatus is seen by the power transmitting apparatus and enables transmission of BT address information.

In this case, a configuration is used where the power transmitting apparatus has the storage region 900 and the storage region 901. The power transmitting apparatus stores the BT address of the power receiving apparatus that was received using load modulation in the storage region 900, and stores the BT address of the power receiving apparatus that is the Inquiry response message transmission source in the storage region 901. Then, the power transmitting apparatus compares the BT addresses using the processing in step S1316 and performs authentication and encryption key generation processing on the BT addresses if they match. In this case, BT authentication processing is performed with only the power receiving apparatus that is present in the power transmission range 201, and therefore the SRES messages always match and needless authentication processing for other BT devices is not performed.

Also, the power transmitting apparatus and the power receiving apparatus may both transmit the corresponding BT addresses from the power transmitting antenna and the power receiving antenna. In this case, a configuration is used where the power transmitting apparatus and the power receiving apparatus both have the storage region 900 and the storage region 901. Upon receiving the BT address 503 of the power transmitting apparatus at time T3 in FIG. 5, the power receiving apparatus subsequently transmits the BT address of the power receiving apparatus. In this case, the power receiving apparatus transmits the Inquiry response to only the power transmitting apparatus that is present in the power transmission range 201. Also, since the power transmitting apparatus performs authentication processing with only the power receiving apparatus that is present in the power transmission range 201, there is an effect of not performing needless processing such as performing authentication processing with a BT device that cannot receive the Wireless Charger service.

Modified Example 2

In addition, similar effects can be obtained also in the case where the communication unit 116 and the communication unit 119 are compatible with a communication standard other than BT, such as wireless LAN. In the case of wireless LAN, it is sufficient to use a configuration where the BT address is replaced with a MAC address, the Inquiry message is replaced with a ProbeRequest message, and the Inquiry response message is replaced with a ProbeResponse message.

For example, in the authentication and connection processing, it is possible to use a Wi-Fi Direct Service standard (referred to as WDFS standard below), which the Wi-Fi alliance is considering standardizing. The WFDS standard is a protocol than can realize authentication and connection processing between one access point and one station on a wireless LAN. Also, the power transmitting apparatus and the power receiving apparatus are both configured to transmit the corresponding MAC addresses from the power transmitting antenna and the power receiving antenna.

Then, if the MAC addresses stored in the storage region 900 and the storage region 901 match, the power transmitting apparatus and the power receiving apparatus start WFDS. Then, if authentication and connection processing are performed only with a wireless LAN apparatus having the MAC address that is stored in the storage region 900 and the storage region 901 by the power transmitting apparatus and the power receiving apparatus respectively, the power transmitting apparatus can perform communication control with the power receiving apparatus that is present in the range in which power transmission can be performed.

Here, a case will be considered where multiple power receiving apparatuses are present in the power transmission range 201 in the system in which control signals are exchanged using a wireless LAN. It is presumed that a power receiving apparatus operating as an access point has gone outside of the communication range 200 for some reason. Thus, the wireless LAN connection between the power transmitting apparatus and the power receiving apparatus operating as the access point is disconnected. For this reason, the power transmitting apparatus cannot exchange control signals with the remaining power receiving apparatuses. Because of this, it is desirable that the power transmitting apparatus is configured to operate as the access point.

Note that a wireless LAN terminal that is compatible with WFDS may possibly be a station or an access point. In a GroupNegotiation phase (referred to below as a "GN phase") in the WFDS standard, it is determined whether the wireless LAN terminal is to serve in the role of the station or the access point. Also, with the WFDS standard, the wireless LAN terminal having a larger intent value from 0 to 15 that is exchanged in the GN phase is to serve in the role of the access point, and the wireless LAN terminal have the smaller intent value is to serve in the role of the station.

Because of this, it is sufficient that the intent value transmitted by the power transmitting apparatus is made larger than the intent value transmitted by the power receiving apparatus. For example, by setting the intent value transmitted by the power transmitting apparatus 100 to the power receiving apparatus 101 in the GN phase to "15" and setting the intent value transmitted by the power receiving apparatus 101 to the power transmitting apparatus 100 in the GN phase to "0", the power transmitting apparatus 100 can operate as the access point, and the power receiving apparatus 101 can operate as the station.

In addition, although the WFDS standard has been described as an example of a protocol for performing authentication and connection processing, it is also possible to use the Wi-Fi Direct standard.

Also, the power transmitting apparatus and the power receiving apparatus are both configured to transmit the corresponding MAC addresses from the power transmitting antenna and the power receiving antenna, but a configuration is also possible where one of the power transmitting apparatus and the power receiving apparatus performs transmission thereof. Thus, based on a wireless LAN standard, the power transmitting apparatus can perform communication control with the power receiving apparatus that is present in the range in which communication is possible, and the power transmitting and receiving apparatuses can identify each other.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-088880, filed Apr. 19, 2013, which is hereby incorporated by reference herein in its entirety.

The invention claimed is:

1. A power transmitting apparatus comprising:
   a first antenna configured to perform wireless power transmission to a power receiving apparatus and perform wireless communication with the power receiving apparatus;
   a second antenna configured to perform wireless communication with the power receiving apparatus, wherein the second antenna is different from the first antenna; and
   one or more processors configured to:
      communicate with the power receiving apparatus, by the first antenna, identification information of at least one of the power transmitting apparatus and the power receiving apparatus, wherein the identification information can be used for communicating by the second antenna;
      determine whether or not a communication connection based on the identification information that is communicated by the first antenna is established via the second antenna;

perform wireless power transmission to the power receiving apparatus by the first antenna based on a determination that the communication connection based on the identification information that is communicated by the first antenna is established via the second antenna, and; and restrict wireless power transmission to the power receiving apparatus based on a determination that the communication connection based on the identification information that is communicated by the first antenna is not established via the second antenna.

2. The power transmitting apparatus according to claim 1, further comprising:
a detector configured to detect an object,
wherein the one or more processors are configured to determine, based on the object being detected by the detector whether or not the communication connection based on the identification information is established via the second antenna.

3. The power transmitting apparatus according to claim 2, wherein the detector is configured to detect the object in response to detection of a change of an impedance of the first antenna that is caused by reception of a detection signal by the object, and
wherein the detection signal is transmitted by the first antenna.

4. The power transmitting apparatus according to claim 2, wherein, based on the object being detected by the detector and the identification information being communicated by the first antenna, the second antenna is configured to perform processing for establishing a communication connection with an apparatus that transmits a message including information indicating that a wireless power transmission service is supported.

5. The power transmitting apparatus according to claim 1, wherein the second antenna is configured to receive a power reception parameter relating to a power reception capability in a case where the second antenna establishes the communication connection, and
wherein the one or more processors are configured to determine, based on the power reception parameter, whether or not to perform the wireless power transmission by the first antenna.

6. The power transmitting apparatus according to claim 1, wherein the second antenna is configured to perform wireless communication compatible with a standard relating to BLUETOOTH®.

7. The power transmitting apparatus according to claim 1, wherein the first antenna is configured to transmit or receive the identification information.

8. The power transmitting apparatus according to claim 1, wherein the identification information is a BLUETOOTH® address or a MAC address.

9. A power receiving apparatus comprising:
a first antenna configured to wirelessly receive power from a power transmitting apparatus and perform wireless communication with the power transmitting apparatus;
a second antenna configured to perform wireless communication with the power transmitting apparatus, wherein the second antenna is different from the first antenna; and
one or more processors configured to:
communicate with the power transmitting apparatus, by the first antenna, identification information of at least one of the power transmitting apparatus and the power receiving apparatus, wherein the identification information can be used for communicating by the second antenna;
determine whether or not a communication connection based on the identification information that is communicated by the first antenna is established via the second antenna; and
perform wireless power reception from the power transmitting apparatus based on a determination that the communication connection based on the identification information that is communicated by the first antenna is established via the second antenna.

10. The power receiving apparatus according to claim 9, wherein the second antenna is configured to transmit a message to the power transmitting apparatus based on a detection signal being detected, and
wherein the message includes information indicating that a wireless power transmission service is supported.

11. The power receiving apparatus according to claim 9, wherein the identification information is a BLUETOOTH® address or a MAC address.

12. The power receiving apparatus according to claim 9, wherein, based on a determination that the communication connection based on the identification information that is communicated by the first antenna is established via the second antenna, the second antenna is configured to transmit a power reception parameter that relates to a power reception capability, and the first antenna is configured to receive power according to the power reception parameter.

13. The power receiving apparatus according to claim 9, wherein the first antenna is configured to transmit or receive the identification information.

14. A method of controlling a power transmitting apparatus,
the power transmitting apparatus including:
a first antenna configured to perform wireless power transmission to a power receiving apparatus and perform wireless communication with the power receiving apparatus; and
a second antenna configured to perform wireless communication with the power receiving apparatus, wherein the second antenna is different from the first antenna,
the method comprising:
communicating with the power receiving apparatus, by the first antenna, identification information of at least one of the power transmitting apparatus and the power receiving apparatus, wherein the identification information can be used for communicating by the second antenna;
determining whether or not a communication connection based on the identification information that is communicated by the first antenna is established via the second antenna; and
performing wireless power transmission to the power receiving apparatus by the first antenna based on determination that the communication connection based on the identification information that is communicated by the first antenna is established via the second antenna; and
restricting wireless power transmission to the power receiving apparatus based on a determination that the communication connection based on the identification information that is communicated by the first antenna is not established via the second antenna.

15. A method of controlling a power receiving apparatus, the power receiving apparatus including:

a first antenna configured to wirelessly receive power from a power transmitting apparatus and perform wireless communication with the power transmitting apparatus; and a second antenna configured to perform wireless communication with the power transmitting apparatus, wherein the second antenna is different from the first antenna, the method comprising:

communicating with the power transmitting apparatus, by the first antenna, identification information of at least one of the power transmitting apparatus and the power receiving apparatus, wherein the identification information can be used for communicating by the second antenna;

determining whether or not a communication connection based on the identification information that is communicated by the first antenna is established via the second antenna; and controlling the first antenna to, in a case where it is determined performing wireless power reception from the power transmitting apparatus based on a determination that the communication connection based on the identification information that is communicated by the first antenna is established via the second antenna.

16. The power receiving apparatus according to claim 9, wherein the second antenna is compatible with a standard relating to BLUETOOTH®.

* * * * *